Dec. 8, 1964 P. E. OSBORN 3,160,712

ELECTRONIC SWITCHING SYSTEM

Filed May 2, 1961 11 Sheets-Sheet 1

INVENTOR.
Peter E. Osborn

BY C. A. Gulbrandsen

Atty.

INVENTOR.
Peter E. Osborn
BY C. A. Gulbransen
Atty.

Dec. 8, 1964 P. E. OSBORN 3,160,712

ELECTRONIC SWITCHING SYSTEM

Filed May 2, 1961 11 Sheets-Sheet 3

INVENTOR.
Peter E. Osborn
BY C. A. Hullbrandt
Atty.

INVENTOR.
Peter E. Osborn
BY
Atty.

INVENTOR.
Peter E. Osborn
BY C. A. Gulbrandsen
Atty.

INVENTOR.
Peter E. Osborn
BY C. A. Gulbrandsen
Atty.

INVENTOR.
Peter E. Osborn
BY C. A. [signature]
Atty

INVENTOR.
Peter E. Osborn
BY C. A. Gulbrandsen
Atty

INVENTOR.
Peter E. Osborn
BY C. A. Gulbrandsen
Atty.

Dec. 8, 1964 P. E. OSBORN 3,160,712

ELECTRONIC SWITCHING SYSTEM

Filed May 2, 1961 11 Sheets-Sheet 10

INVENTOR.
Peter E. Osborn
BY C. A. Nullander
Atty.

Dec. 8, 1964 P. E. OSBORN 3,160,712

ELECTRONIC SWITCHING SYSTEM

Filed May 2, 1961 11 Sheets-Sheet 11

INVENTOR.
Peter E. Osborn
BY C. A. Gulbrandsen
Atty.

United States Patent Office 3,160,712 Patented Dec. 8, 1964

3,160,712
ELECTRONIC SWITCHING SYSTEM
Peter E. Osborn, Addison, Ill., assignor to Automatic Electric Laboratories, Inc., Northlake, Ill., a corporation of Delaware
Filed May 2, 1961, Ser. No. 107,213
15 Claims. (Cl. 179—18)

This invention relates to an electronic switching system, and more particularly to a communication system using time division multiplex principles for switching.

A communication system of the type described above is disclosed in the copending U.S. patent application to A. H. Faulkner et al. Serial No. 843,380, filed September 30, 1959, now Patent No. 3,015,699. In that invention, connections are selectively established between any of a group of line circuits and any of a group of connecting units by providing common control equipment shared on a time division multiplex basis by the connecting units and by providing in said common control equipment logic circuits for use in selecting the individual line circut to be effectively connected with an individual connecting unit in a given call and also circuits for selectively operating the switching arrangement to establish the connections.

The common control equipment comprises two groups of time division multiplex circuits having different distribution cycles; one of the groups of circuits being associated with high-speed storage apparatus including a high-speed memory and circuits for storing, on a time sharing basis, the identity of the line circuit to be effectively connected with an individual connecting unit in a given call, and operably at the hgh-speeds necessary for time division multiplex transmission of voice frequency signals; and the other group, because of the comparatively low-speed of the conventional dial used at the subscriber substations, being associated with low-speed storage apparatus including a low-speed memory and circuit for storing, on a time sharing basis, the state of said call in accordance with supervisory signals received from the line circuits.

It is the object of this invention to provide new and improved arrangements for controlling the selection and establishment of connections in an electronic switching system.

A feature of the invention is the provision of signaling means at each of the subscriber substations for providing, at a speed which is compatible with time division multiplex operation, variable-width direct-current supervisory signals.

Another feature of the invention relates to the registration of the digits represented by the variable-width direct-current supervisory signal. According to this feature, the register is advanced with every other multiplex pulse thus variations in the operation of the signaling means can be tolerated without faulty digit registration. If an attempt were made to advance with every pulse there could be no tolerance since the signal from the substation can start at any random time.

Another feature of this invention relates to the common control equipment. Two groups of time division multiplex circuits, each having the same distribution cycle, are used. One group of circuits comprises storage apparatus having circuits for storing, on a time sharing basis, the identity of the line circuit to be effectively connected with an individual connectng unit in a given call, and the other group of circuits comprises storage apparatus having circuits for storing, on a time sharing basis, the state of said call in accordance with supervisory signals received from the line circuits.

A further feature of this invention is the provision of a single memory which constitutes a portion of the storage apparatus of both of the above-mentioned two groups of time division multiplex circuits.

The above-mentioned and other objects and features of this invention and the manner of attaining them will become apparent and the invention itself will be understood, by reference to the following description of an embodiment of the invention taken in conjunction with the accompanying drawings comprising FIGS. 1–14 wherein:

FIG. 1 is a single line block diagram of the entire system, with the single ferrite-core memory shown schematically;

FIGS. 2 to 6, when arranged together as shown in FIG. 13, comprises a diagram showing the interconnections of the various units, with the subscriber substations and line circuits shown by schematic and block diagrams in FIG. 2, transmission circuits shown by block diagrams in FIG. 3, the register control circuits shown by block diagrams in FIG. 4, the high-speed registers shown by block diagrams in FIG. 5, and the pulse sources shown by block diagrams in FIG. 6;

Figure 13:
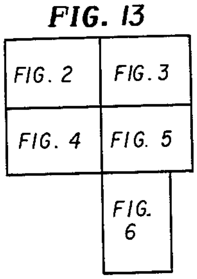
Figure 12:
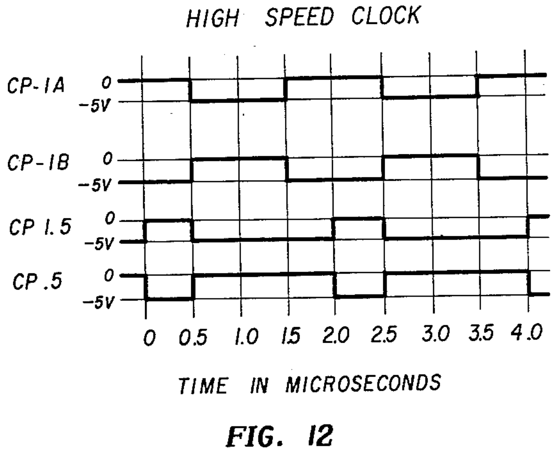
Figure 14:
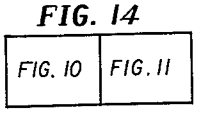
Figure 10:
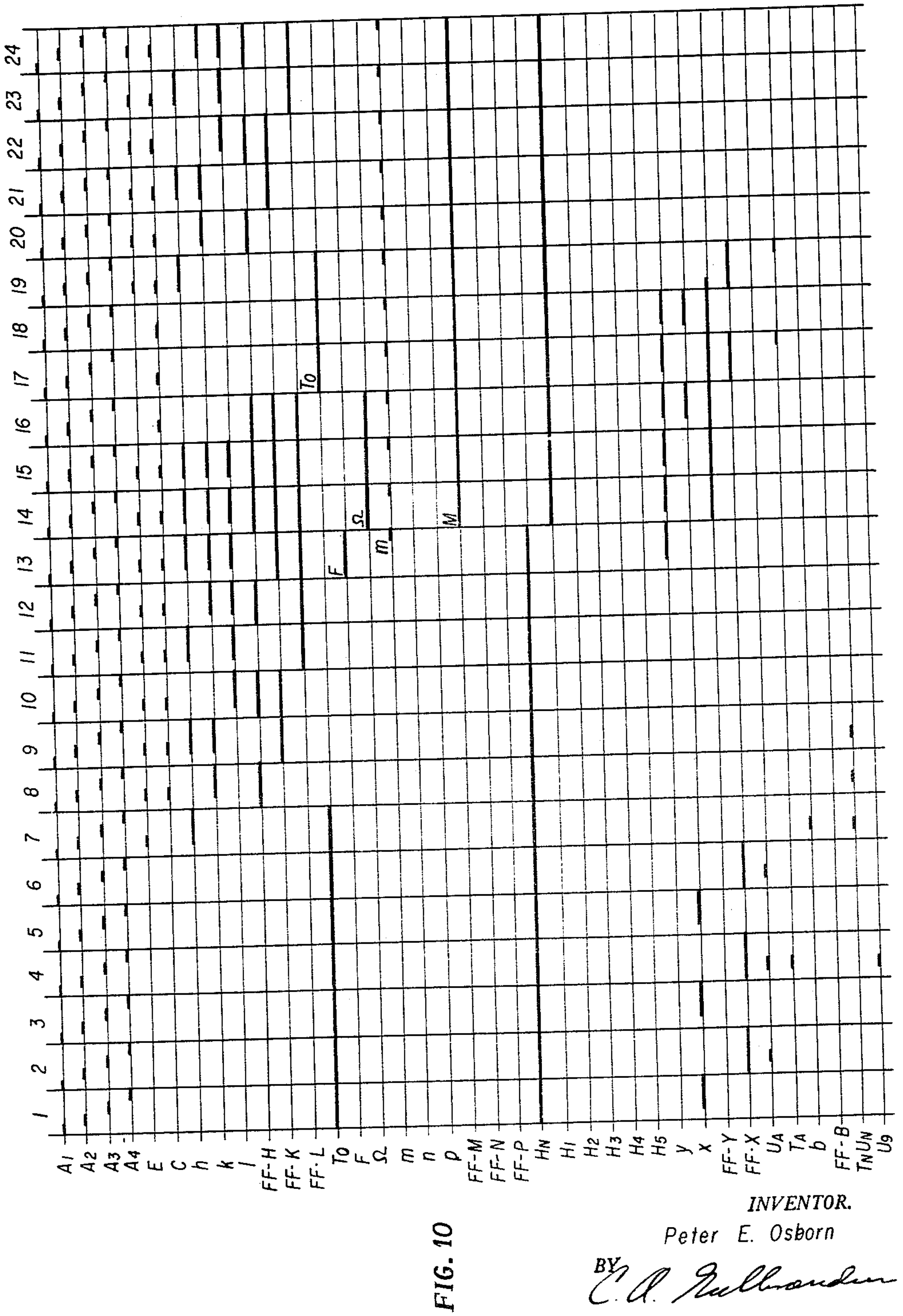
Figure 11:
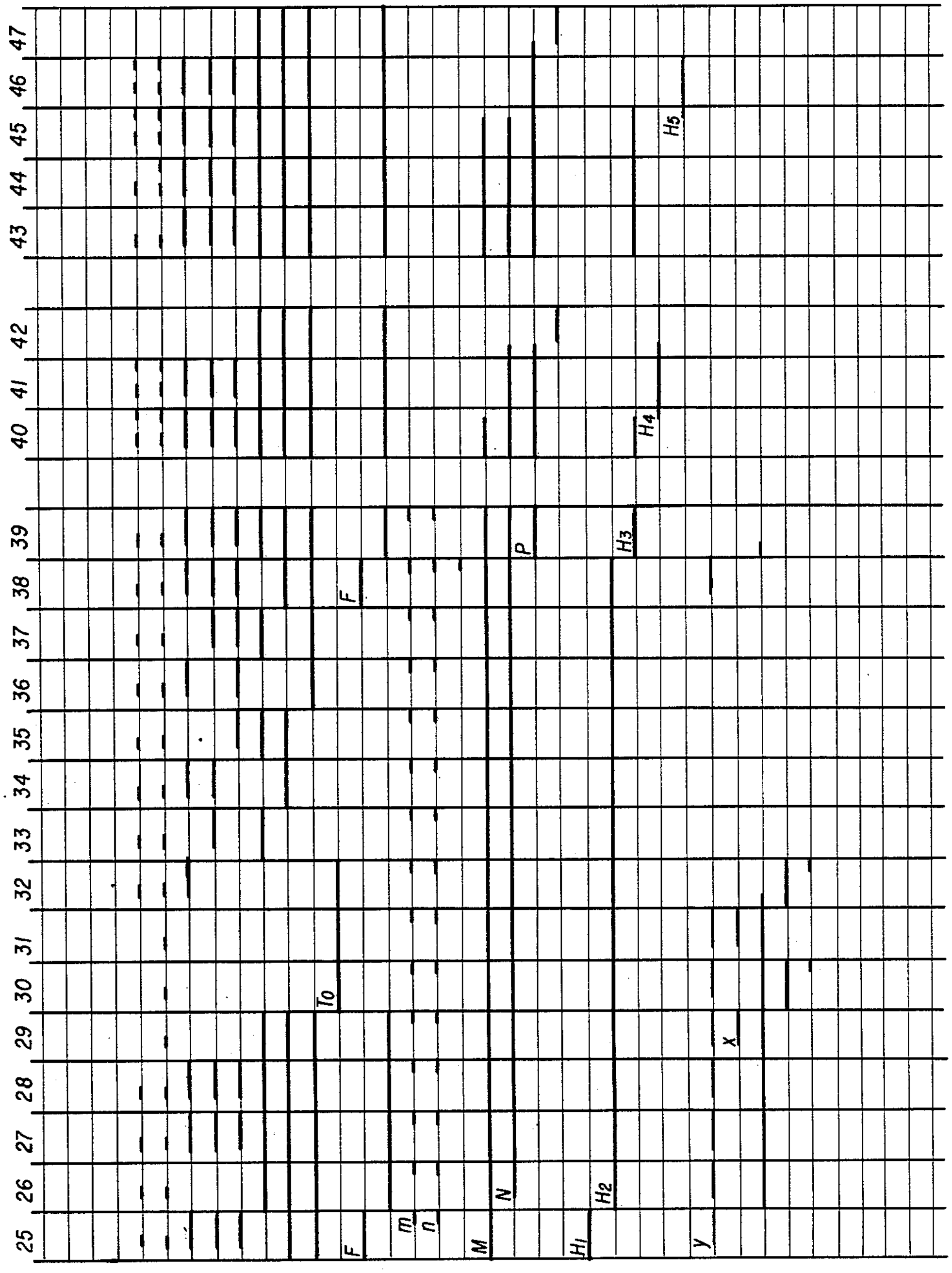

FIGS. 10 and 11, arranged as shown in FIG. 14, is a graph showing the sequence of operation of the various units;

FIG. 12 is a graph showing the output pulses of the high-speed clock;

FIGS. 13 and 14 show how various ones of the figures are to be arranged.

GENERAL DESCRIPTION (FIG. 1)

Figure 1:
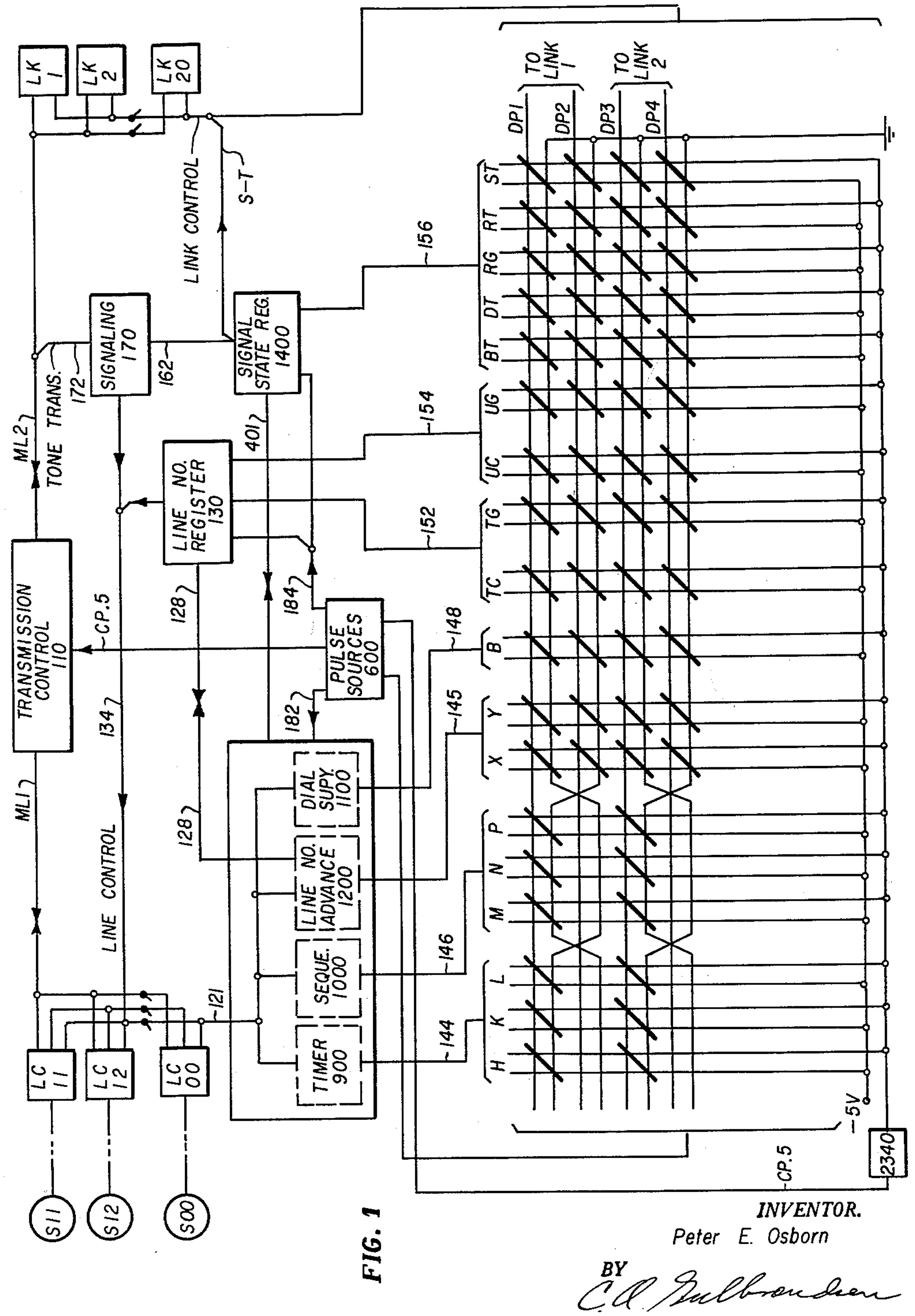

Referring to FIG. 1, the exchange includes 100 line circuits LC11 to LC00 associated with stations S11 to S00 and a plurality of link circuits LK1 to LK20 interconnected by a time division multiplex transmission highway ML1–ML2 having a transmission control unit 110 interposed therein. Any two line circuits may be effectively connected through any link circuit by selectively supplying control pulses to them.

The signaling circuits 170 supply supervisory tones which are transmitted by time division multiplex over line 172 and the highway ML1–ML2 to the line circuits of calling lines. The signaling circuits 170 also supply ringing control signals over conductors in the control line 134 to the line circuits of called lines.

The function of remembering which circuits are interconnected on a time division multiplex basis over highway ML1–ML2 and of supplying control pulses to the selected transmission gates in the appropriate time slots is performed by a high-speed memory 150 in conjunction with a line number register 130 and a signal state register 1400. The control pulses are supplied to the line circuits over line 134, to the link circuits over lines DP and S–T, and to the signaling circuits over line 162.

The selective registration in the high-speed memory through the line number register 130 and the signal state register 1400 is controlled by the register control circuits 400. These circuits 400 control the line-finding function of scanning to find a line which has initiated a call and causing a connection to be established to the calling line; and the connector function of detecting dial pulses from the calling line and causing a connection to be established to the called line. These control circuits 400 are shared by all of the links on a time division basis, using the high-speed memory 150 for storage.

The pulse sources 600 comprise pulse generators and distributors for supplying all of the pulses required by the exchange.

The high-speed memory 150 comprises a coordinate array of ferrite-cores. The horizontal rows are associated with the links, and the vertical columns are associated with flip-flop type storage devices in the associated units 400, 130, and 1400. A pulse distributor in the pulse sources 600 supplies pulses to the horizontal conductors in turn. Each horizontal row has a read winding and a ½-write winding threaded through the cores of the row, and each vertical column has a sense winding and a ½-write winding. During each stage of the distributor, a read pulse is supplied through the read winding of the row, causing the state of each core of the row to be transferred by means of the sense windings to the flip-flops. The information in the flip-flops is then utilized and possibly altered by the associated circuitry. A ½-write pulse is applied to the horizontal winding, and coincidently to selected ones of the vertical windings to return the information from the flip-flops to the cores. This is repeated, in turn, for each horizontal row during successive stages of the distributor. The high-speed memory comprises cores in three columns H, K, and L for registering the timer states, three columns M, N, and P for registering the sequence state, two columns X and Y for registering the line number advance states, one column B for registering the busy states, five columns TC to TG for registering the tens digit, five columns UC to UG for registering the units digit, and five columns BT, DT, RG, RT, and ST for registering the signal states. Each horizontal row is associated with one time slot of the multiplex transmission. Each stage of the distributor comprises a 0.5-microsecond read pulse followed by a 1.5-microsecond ½-write pulse in a 2-microseconds time slot. The horizontal ½-write windings are connected at one end to the distributor and at the other end over line DP to the link circuits for transmission control. The ½-write windings of the first two rows are connected over leads DP1 and DP2 to link 1 to control the calling party and called party transmission, respectively. Successive pairs of horizontal rows are in like manner coupled to successive links, so that each link is permanently associated with two high-speed memory rows corresponding to two transmission time slots, one for the calling party and the other for the called party. Also, during each of the 1.5-microseconds pulse intervals, the line number register 130 translates the two-out-of-five code registration of the tens digit to a one-out-of-ten code signal supplied to a conductor in line 134, and the two-out-of-five code of the units digit is translated to a one-out-of-ten code signal supplied to another conductor of line 134, to control the transmission in the line circuit corresponding to this number. At the same time, the signal state register 1400 controls the transmission of supervisory tones to the calling line, ringing to the called line, and switch-through of the link transmission gates, as required.

The register control circuit 400 receives hookswitch and line-busy information from the line circuits and registers this information in flip-flops for use by the other circuits. The timer circuit 900 times the dialing and other hookswitch signals to determine when the sequence state should be changed. The timer uses the cores in columns H, K, and L to register the time intervals on a binary basis, separately for each link. The sequence circuit 1000 registers the sequence states of the links, which are: normal, tens dialing, units dialing, ringing, busy test, and conversation. The sequence circuit uses the cores in columns M, N, and P to register these states on a binary basis for each link. The dialing supervisory circuit 1100 is provided to insure that the line circuits are not seized by more than one of the idle links when they become busy, and to prevent idle line circuits from being represented as being busy during scanning. This circuit uses the cores in column B. The line-number-advance circuit 1200 supplies advance or rewrite signals to the line number register 130 to control the number registration in the high-speed memory 150.

GENERAL INTERCONNECTION DIAGRAM (FIGS. 2–6)

FIGS. 2–6, inclusive, when arranged together as shown in FIG. 13, comprise a diagram showing the interconnections of all the units of the system.

*Substations (FIG. 2)*

Figure 2:
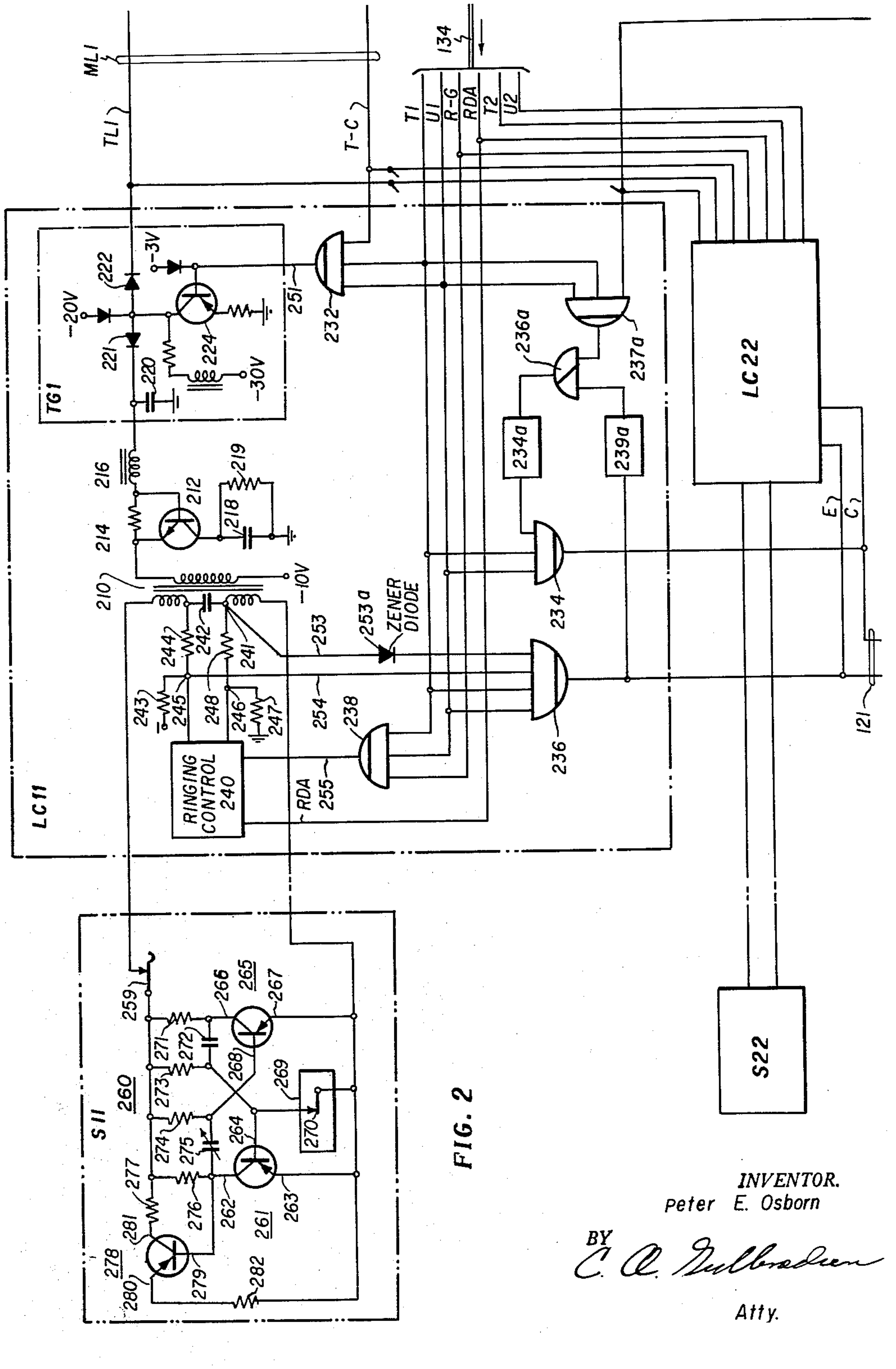

Two of the substations S11 and S22 associated with the line circuits LC11 and LC22, respectively, are shown in FIG. 2. The substation S22 is only shown in block diagram form and only the dialing or signaling circuitry of the substation S11 is shown. The substations are all of the same type, and the speech circuitry which is not shown may be of the conventional type. The dialing mechanism comprises as its principle components a multivibrator 260, a switch transistor 278 connected in series with the line and under control of the multivibrator 260, a variable capacitor 275 under the control of ten pushbuttons (not shown) and a switch 269 under control of the same pushbuttons.

The dialing mechanism is designed to provide variable-width direct-current supervisory signals by interrupting the normal flow of direct-current over the loop circuit for predetermined intervals of time depending on the value of capacitance included in the circuit by operation of one of the pushbuttons. The variation in the voltage drop across a resistor, for example, the resistor 248, i.e., the point 241 of the line circuit LC11, due to the interruption of the normal flow of direct-current by the dialing mechanism provides the hookswitch and dial pulse signals.

*Line Circuits (FIG. 2)*

Two of the 100 line circuits are shown in FIG. 2, with one, LC11, shown by a schematic and functional block diagram, and the other, LC22, shown as a single block. These line circuits are connected by subscriber lines to their respective stations S11 and S22, in multiple to the multiplex transmission line ML1, to conductors of the control line 134, and in multiple to the line supervision conductors 121. Referring to the connections to the control line 134, the line number pulses are supplied to line circuit LC11 on conductors T1 and U1, and to circuit LC22 on conductors T2 and U2; while for ringing control both line circuits are connected to conductors RG and RDA.

Each line circuit may be considered in two parts, one part relates principally to signaling and supervision circuits, and includes the circuits connected to the subscriber side of transformer 210, along with gates 234, 236, 236*a*, 237*a*, and 238; and the other part relating principally to the audio to multiplex coupling comprises the circuit connected between transformer 210 and the multiplex line ML1 along with gate 232. All of the gates 232, 234, 236, 236*a*, 237*a*, and 238 are controlled by signals from the line number register 130 (FIG. 5) so that they may be activated to produce output signals in the true condition only when there is coincidence on the two line number conductors, which, for line circuit LC11, are T1 and U1. Only one line circuit may be so activated during each two-microsecond time slot.

It has become conventional in electronic telephone systems to supply direct-current for the station through resistance devices coupled to the subscriber line in the line circuit, and to use the variation in voltage drop in this resistance for hookswitch supervision. Here, the negative terminal of the direct-current source is connected through resistors 243 and 244 and a winding section of transformer 210 to one of the subscriber line wires, and the grounded positive terminal is connected through resistors 247 and 248 on another winding section of the transformer to the other line wire. To bypass the resistors and direct-current source, a capacitor 242 having low-impedance at voice frequencies is connected between the two winding sections of the transformer. Conductors 253 and 254 are connected from junction points 241 and 245, respectively, of the resistors to control the hookswitch supervision gate 236. The conductor 254 is connected to the negative supply side and therefore is normally in a true condition except during ringing. The signal on conductor 253 follows the hookswitch and dial pulse signals to permit pulses to be transmitted to lead E when the line loop is closed, and to interrupt this train of pulses when the line loop opens.

When the line circuit is in use the first pulse to appear on lead E is supplied to gate 234 via a two-microsecond delay line, the gate *236a* and a device *234a*, which may be, for example, a monostable multivibrator, designed to provide an output signal for at least a minimum of 80 microseconds, or one transmission cycle. This arrangement assures that the line circuit will not be seized by more than one idle link which is scanning. The gate 234 is enabled to supply a train of pulses to lead C to mark the line busy. The gate *237a* is enabled by pulses appearing on the lead B, as well as the line gate multiplex pulses T and U, and assures that output signals will appear on the lead C during dialing when no signal pulses appear on lead E.

To ring the substation S11, coincident pulses are applied to leads RG, T1 and U1 to enable gate 238 and apply pulses over its output lead 255 to the ringing control unit 240. An interrupter voltage is applied over lead RDA. The ringing control unit 240 responds to these signals to apply a ringing signal to the points 245 and 246 of the direct-current feeding resistance network, causing a current to flow over the subscriber line to operate a tone ringer (not shown) of the substation S11. The current flow during the ringing signal causes a signal on lead 253 which looks like an off-hook supervisory signal. A ground potential is applied to the lead 254 to block the gate 236 during this ringing interval. However, the interrupter voltage on lead RDA is on for two seconds and off for four seconds, and during the off period the potential on lead 254 returns to the normal negative value so that gate 236 may respond to the hookswitch signal when the subscriber answers.

Voice frequency signals at the transformer 210 are coupled through an impedance converter 212 and a filter which includes inductor 216 to a multiplex transmission gate TG1 which is controlled by pulses from gate 232. The transmission gates of all of the line circuits are connected in common to the end ML1 of the multiplex transmission line.

*Link and Transmission Control Circuits (FIG. 3)*

Figure 3:
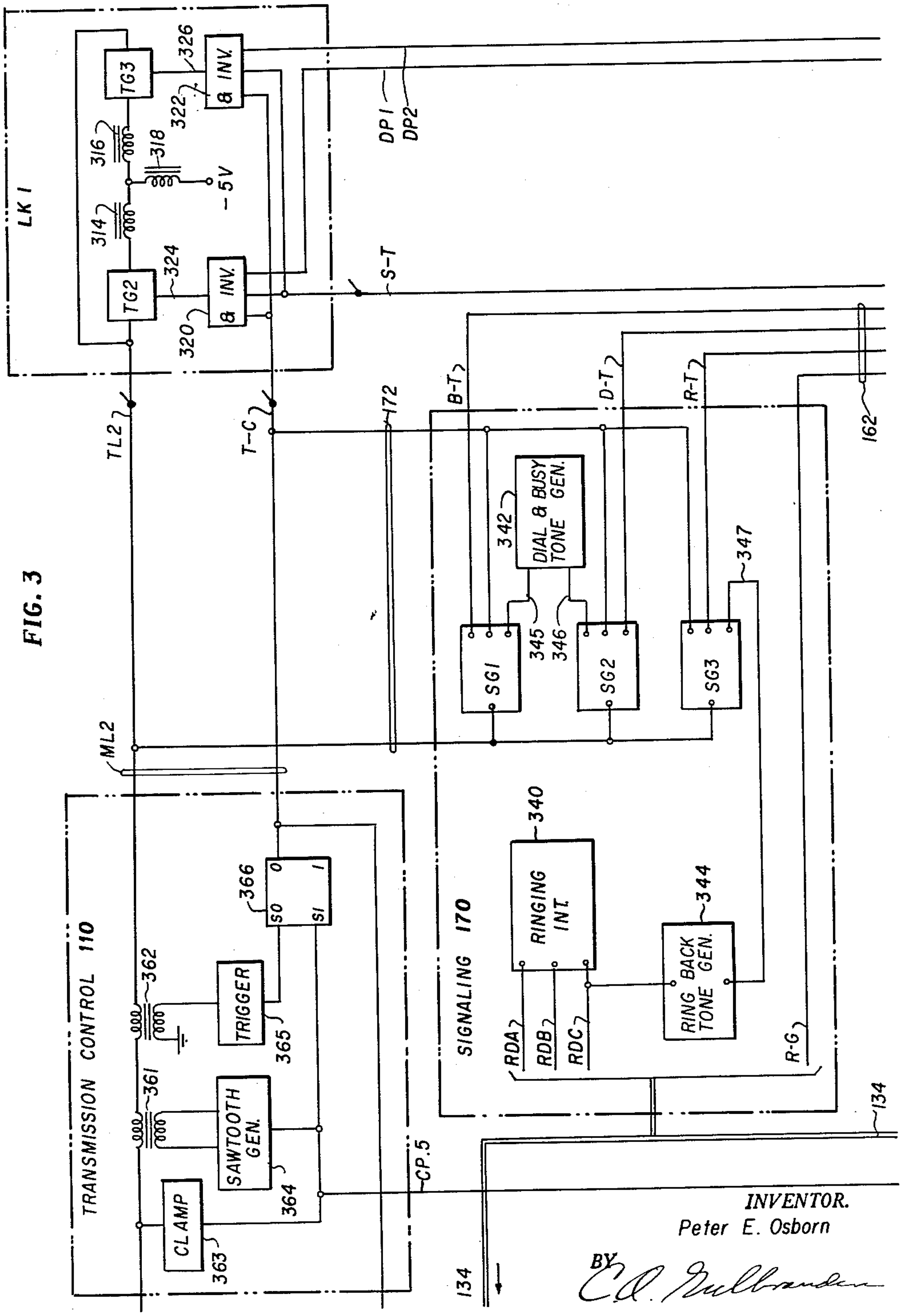
Figure 4:
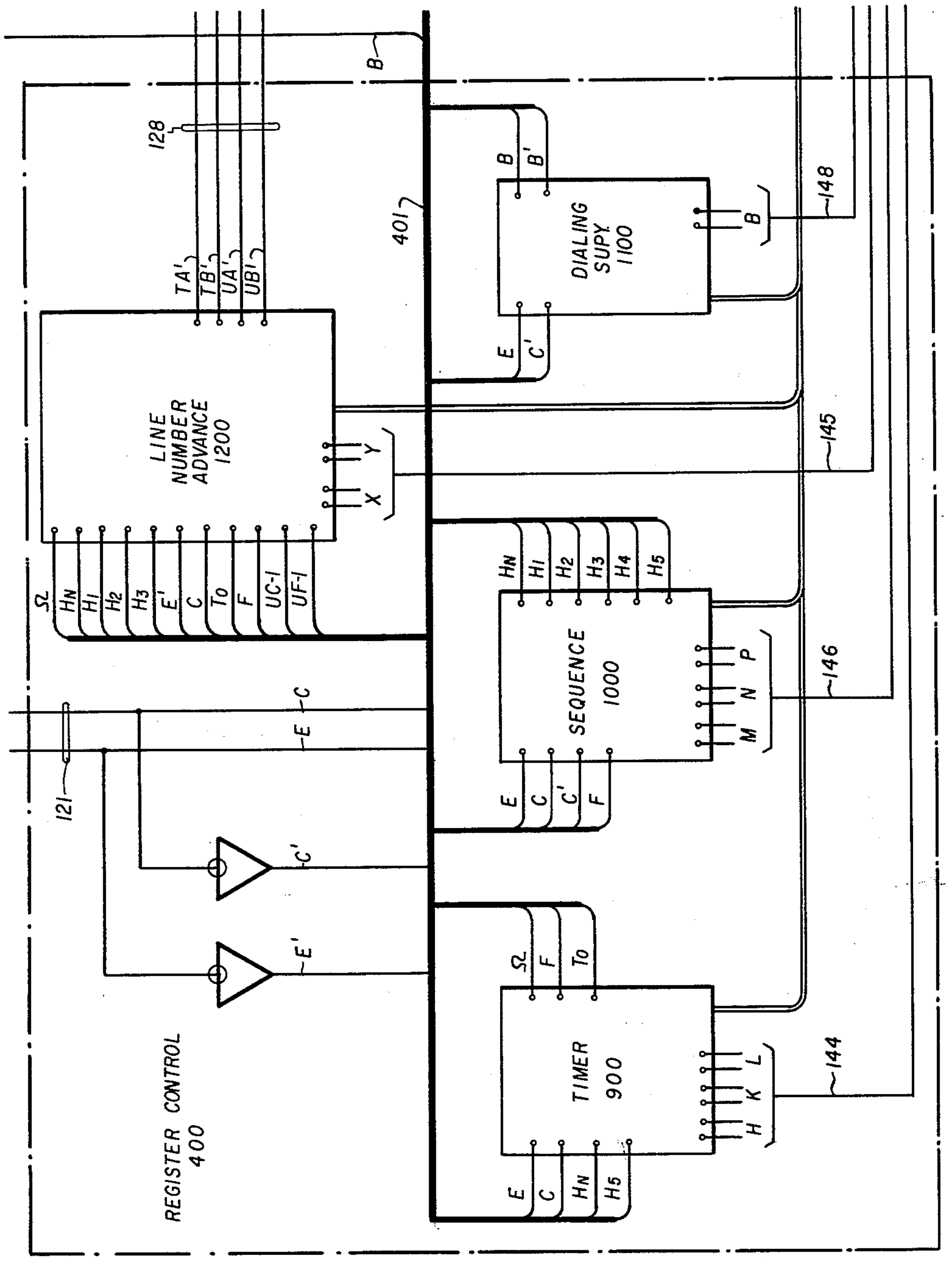
Figure 5:
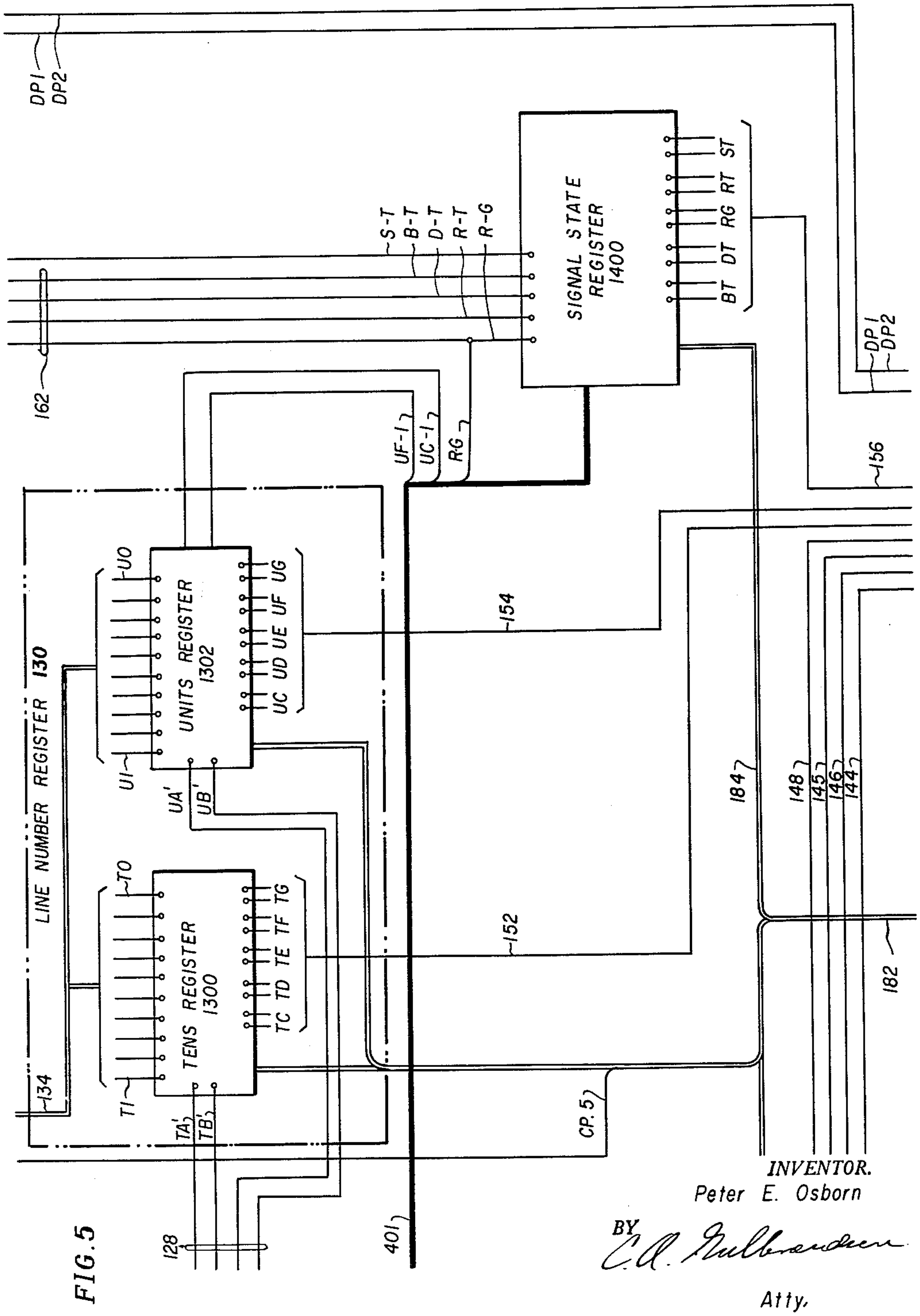

Each of the link circuits includes only the circuitry required for multiplex transmission; the register, line finding, dialing, and other switching control circuitry shown in FIGS. 4 and 5 being shared on a time division basis by all of the links, with storage in the high-speed memory 150. One of the link circuits LK1, is shown in FIG. 3. It comprises two multiplex transmisison gates TG2 and TG3, for multiplex connections to the calling and called lines, respectively. These gates are coupled at voice frequency through inductors 314 and 316, with direct-current bias supplied through an inductor 318. The calling line transmission gate TG2 is controlled by pulses on lead DP1 supplied through gate 320; and the called line transmission gate is controlled by pulses on DP2 supplied through gate 322, when coincident pulses are supplied over the switch-through conductor S–T. These gate circuits 320 and 322 are of a special type which produce inverted output pulses when all three inputs are true.

A transmission control unit 110, which is inserted in the multiplex line ML1–ML2 includes a clamp circuit 363, a sawtooth generator 364, a trigger circuit 365, and a flip-flop 366. The sawtooth generator and the trigger circuit are connected respectively by transformers 361 and 362 in series with the common highway conductor TL1–TL2. The clamp circuit 363 is provided to reduce cross talk. The sawtooth generator 364, trigger 365, and flip-flop 366 along with a control conductor T–C extending from the flip-flop 366 in multiple to all of the transmission gates in the line and link circuits are used in controlling the multiplex pulses in each time slot, as explained in the Faulkner et al., Patent 3,015,699.

*Signaling Circuits (FIG. 3)*

The signaling unit 170 includes three signaling gates SG1, SG2, and SG3, for supplying supervisory tones over the multiplex highway to the calling lines. Each of these signaling gates is essentially similar to one-half of a link circuit, in that it includes a transmission gate (not shown) similar to the gate TG2, an inverting AND gate (not shown) similar to the gate 320 for supplying pulses to the transmission gate, and a network (not shown) for coupling the input tone and direct-current bias to the transmission gate. In each case, one of the inputs to the AND gate is the transmission control lead T–C and the other input is the respective one of the leads B–T, D–T, or R–T supplied over line 162 from the signal state register 1400 (FIG. 5). The outputs from the signal gates are connected in multiple to the end TL2 of the common highway. A dial and busy tone generator 342 supplies busy tone over conductor 345 to signal gate SG1, and dial tone over lead 346 to signal gate SG2. The ringback tone is supplied to signal gate SG3 over conductor 347 from a ringback tone generator 344.

The signaling unit 170 also includes a ringing interrupter 340 for supplying interrupter voltage to the line circuits. The output is supplied for two seconds to each of the leads RDA, RDB, and RDC in turn, so that each is on for two seconds and off for four seconds during each six-second period. Each of these output leads is connected to approximately one-third of the line circuits. One of the interrupter output leads is also connected to the ringback tone generator 344, to interrupt its output in the same manner as the ringing signals.

*Register Control Circuits (FIG. 4)*

Figure 6:
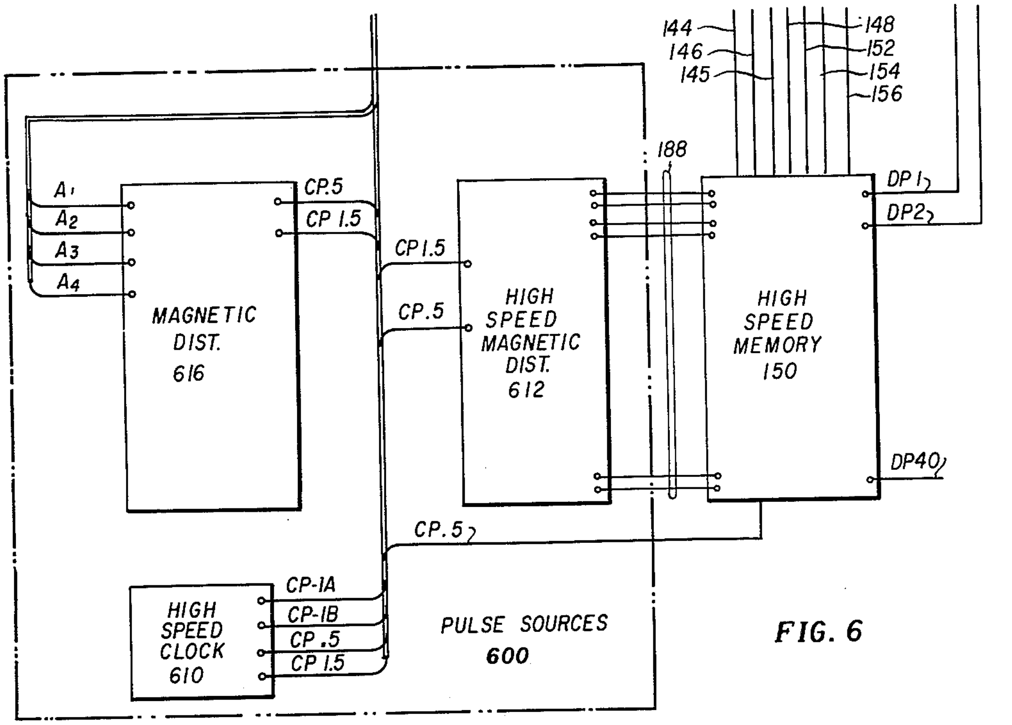

The register control circuits 400 shown in FIG. 4 receive hookswitch and line-busy signals on leads E and C, respectively, from the line circuits and supply output signals on conductors 128 from the line number advance unit 1200 to control the rewrite, advance, and clearing of the tens and units digits designating the line registered in the line number register 130 (FIG. 5). Clock pulses are supplied to the circuits in FIG. 4 by conductor group 182 from the sources shown in FIG. 6. As may be seen by reference to FIGS. 7–9, inclusive, the register control circuits includes logic gates, flip-flops, and amplifiers. In each circuit, the input is supplied to the logic gates, and the output is obtained directly from the flip-flops or from output amplifiers. The flip-flop output leads are designated by reference characters either primed or not primed indicating a false or 0 condition or a true or 1 condition, respectively. The output conductors from all of the units except the line number advance unit 1200 are shown as comprising a conductor group 401; and these conductors are connected as inputs to several circuits of FIG. 4 and also to the signal state register 1400 in FIG. 5, as shown. The timer 900, sequence circuit 1000, dialing supervision circuit 1100 and line number advance circuit 1200 are also connected by lines 144, 146, 148, and 145, respectively, to the high-speed memory 150 (FIG. 6).

The timer 900 may advance through eight steps, making one step each 2 microseconds with output states designated $$H'K'L'=T_0$$
$$HK'L'=T_1$$
$$H'KL'=T_2$$
$$HKL'=T_3$$
$$H'K'L=T_4$$
$$HK'L=T_5$$
$$H'KL=F$$
$$HKL=\Omega$$

Output conductors are only necessary for three of these states, namely, conductors $T_0$, F and Ω, in sub-group 901 of group 401.

The sequence circuit 1000 has an output conductor $H_n$ for the normal state, and conductors $H_1$, $H_2$, $H_3$, $H_4$, and $H_5$ for successive states, these output conductors comprising sub-group 1001 of group 401.

The output of the dialing supervision circuit 1100 comprises conductors B and B′, in sub-group 1101 of group 401.

The output conductors 128 from the line number advance circuit 1200 comprise conductors TA′ and UA′ for advancing the tens register and units register (FIG. 5) respectively, and conductors TB′ and UB′ to the two registers, respectively, for causing rewrite of the same digit in each.

*High-Speed Registers (FIG. 5)*

Referring to FIG. 5, the line number register 130 comprises a tens register 1300 and a units register 1302. The tens register has the five conductor pairs TC to TG in group 152, and the units register has a similar five pairs of conductors UC to UG in group 154, which are threaded through the columns of the cores in the high-speed memory 150, as shown in FIG. 1. In each of the registers, the five conductor pairs are associated with five flip-flops for the two-out-of-five number registration. The tens register is supplied with input signals on leads TA′ and TB′ for controlling the advance and rewrite, and similarly the units register is supplied with input signals UA′ and UB′. In the tens register, the two-out-of-five code is translated to a one-out-of-ten code and supplied through individual output amplifiers to the conductors T1 to T0 in conductor group 134, and similarly the units register supplies signals to the leads U1 to U0, also in conductor group 134. In addition, a connection is made from the flip-flop output conductors UC-1 and UF-1 into cable 401 for controlling the line number advance circuit 1200 in FIG. 4.

The signal state register 1400 has five conductor pairs, BT, DT, RG, RT, and ST, in group 156 to columns of the high-speed memory 150 (FIG. 6), each conductor pair being associated with a signal state flip-flop in the register. Input is supplied by conductors in group 401 from the register control circuits 400. Output is supplied through individual output amplifiers to leads R–G, R–T, D–T, B–T, and S–T. The signals R–T, D–T, and B–T supply control pulses to the signal gates in the signaling circuit 170 (FIG. 3). The signal on conductor S–T controls the switchthrough of the transmission gates in the link circuits. The output conductor R–G is shown connected through line 162, and the signaling circuits 170 in FIG. 3 to line control group 134 to the line circuit, to control the ringing of called lines. Both the line number register 130 and the signal state register 1400 are supplied with clock pulses over conductor group 184 from the sources shown in FIG. 6.

*Pulse Sources and Definitions (FIG. 6)*

The pulse sources 600 are shown in FIG. 6. The primary source is a high-speed clock 610. The output pulses from this clock drive a distributor 612 for driving the high-speed memory 150 and supplies pulses for the transmission circuit. The output of the high-speed clock 610 also drives a four-stage distributor 616 for controlling logic circuits in the register control circuit 400.

In reference to the pulses, the following definitions relate to the terms used in this application.

Time slot: A two-microsecond interval, being one complete cycle of the high-speed clock 610. Each time slot comprises a 0.5-microsecond guard interval followed by a 1.5-microseconds interval during which transmission and various control operations take place.
Transmission cycle: A time interval comprising 40 time slots or 80 microseconds, being one cycle of the distributor 612.
Timer step: An interval of 2 microseconds.
Coincident: Used with reference to two or more signals which overlap in time, usually at the input of a gate.
Simultaneous: Used with reference to signals or events occurring during the same time cycle, such as a transmission cycle, although possibly in different time divisions of the cycle.

FIG. 12 is a graph of the pulses produced during each time slot by the high-speed clock 610. The pulses on lead CP.5 occur during the guard interval and have a duration of 0.5-microsecond. The pulses on lead CP1.5 occur during the remainder of the time slot and have a duration of 1.5-microseconds. The pulses on lead CP1A and CP1B each have a duration of 1 microsecond and occur during each time slot as shown.

The distributor 612 has forty stages and is driven one stage per time slot. The input is supplied by the pulses on leads CP.5 and CP1.5 from the high-speed clock 610. Each stage drives a row of the high-speed memory 150, and has two output leads threaded through the cores of the corresponding row. One of the outputs of each stage is a 0.5-microsecond pulse for applying a read-out potential to the cores. As shown in FIG. 1, each of these leads is connected to ground on the right hand side of the memory 150. The other output from each stage is a 1.5-microseconds signal for supplying a ½-write potential to the cores. The leads from these outputs extend through cores of the high-speed memory 150 to the distributor pulse leads DP1 to DP40, which are connected individually to transmission gates of the links. Lead DP1 is connected to the calling side transmission gate, and lead DP2 is connected to the called side transmission gate of link 1. The succeeding pairs of the leads DP are connected to succeeding links, each odd-numbered distributor pulse being supplied to a calling side gate, and each even numbered distributor pulse being supplied to a called side gate of a link. Thus, each of the forty distributor pulses corresponding to one time channel of the multiplex transmission, and is permanently associated with a link transmission gate.

The distributor 616 has four stages and is driven two stages per time slot. The input is supplied by the pulses on the leads CP.5 and CP1.5 from the high-speed clock 610. The output pulses on the leads $A_1$ and $A_3$ and the output on the leads $A_2$ and $A_4$ correspond to the CP.5 and CP1.5 pulses in the high-speed clock 610, respectively, and are supplied to the various circuits in the register control circuit 400 coincidence with these pulses. Thus, it may be observed that the pulses on the leads $A_1$ and $A_2$ correspond and coincide with the read and ½-write pulses, respectively, applied to the calling party rows of the high-speed memory 150, and the pulses on the leads $A_3$ and $A_4$ correspond and coincide with the read and ½-write pulses, respectively, supplied to the called party rows of the high-speed memory 150.

TIME DIVISION DISTRIBUTION PLAN

In the system disclosed in the Faulkner et al. Patent 3,015,699 there are two groups of time division multiplex circuits having different distribution cycles, one of the groups being associated with a high-speed memory, and the other group being associated with a low-speed memory. The present system also utilizes two groups of time division multiplex circuits, however, both groups have the same distribution cycle, and both groups are associated with a single high-speed memory 150. One of the groups of circuits controls the time division transmission of voice and tone signals over the multiplex line ML1–ML2. Referring to FIG. 1, and also to FIGS. 2, 3, 5, and 6, this group includes the high-speed clock 610, the high-speed magnetic distributor 612, one portion of the high-speed memory 150, the line number register 130, the signal state register 1400, all of the line circuits LC11 to LC00, all of the link circuits LK1 to LK20, the signaling circuits 170, and the transmission control unit 110. The high-speed clock 610 has a cycle of two-microseconds which is referred to as a time slot. As shown in FIG. 12, the time slot is divided into 0.5-microsecond and 1.5-microseconds intervals, corresponding to the respective outputs CP.5 and CP1.5 from the clock. The output pulses from the clock 610 drive the high-speed magnetic distributor 612. This distributor has forty stages of two-microseconds each, making a total cycle of eighty microseconds. Each cycle of this distributor is one transmission cycle on the multiplex line ML1–ML2, and each stage occurring in successive cycles comprises one transmission channel. In each channel transmission occurs during the 1.5-microseconds interval, and the 0.5-microsecond interval is used as a guard interval between channels. The distributor 612 has two output leads for each stage, and for each stage the pair of output leads are threaded through one horizontal row of the high-speed memory 150. On one of the leads a read pulse is delivered during the 0.5-microsecond interval, and on the other a ½-write pulse is delivered during the 1.5-microseconds interval. The writing leads extend through the memory and thence to the links to form the principal distributor pulse output leads. These forty DP leads are grouped in successive pairs extending to the twenty links. For each link the odd numbered DP pulse is used for controlling the calling line gate, and the even numbered pulse is used for controlling the called line gate. Thus, each link uses two adjacent channels in the transmission cycle for a connection between two lines.

The line number register 130 in conjunction with the associated cores in the high-speed memory 150 delivers pulses to the line circuits in coincidence with the pulses delivered to the link transmission gates with which they have been selectively connected.

In accordance with stored information in the high-speed memory 150, the line number register 130 delivers pulses to the line circuits, and the signal state register delivers pulses to the signaling circuit 170 and to the link circuits LK1 to LK20, so that for each channel for which a connection has been established, two transmission gates connected to the multiplex line, one at the end ML1 and the other at the end ML2, are pulsed in coincidence.

The other group of circuits provide for time division sharing of the circuits used in performimg most of the logical operations required by the links to set up connections between lines. Referring to FIGS. 1, 4, and 6, these circuits comprise the high-speed clock 610, the magnetic distributor 616, the other portion of the high-speed memory 150, and the register control circuits 400.

The distributor 616 driven by the high-speed clock 610 produces four output pulses $A_1$–$A_4$ requiring a total of two time slots or four microseconds. During the pulse interval $A_1$ information is transferred from the calling party row of the high-speed memory 150 to the register control circuit 400; during the pulse interval $A_2$ the line supervision leads C and E are analyzed, the information obtained from the line circuits and memory is used to perform logical operations, to deliver appropriate output signals on the conductors 123 to the line number register 130 as well as over the line 401 to the signal state register 1400, and the information, which may or may not have been altered, is transferred back into the same row of the memory 150; during the pulse intervals $A_3$ and $A_4$ the called party row is read out, analyzed, and transferred back to the same row of the memory 150, in much the same manner as the calling line rows. Thus, each link shares the register control circuits 400 for two time slots.

DETAILED DESCRIPTION

The structure and function of the dial mechanism at each of the associated substations will now be described by reference to the dial mechanism at substation S11, shown in FIG. 2.

The transmitting and receiving portion of the substation has been eliminated for clarity, only the dialing mechanism being shown. The dialing mechanism is designed to operate with electronic exchanges that use multiplexed pulses to perform logic operations, and particularly designed for use in conjunction with the present disclosed electronic time division multiplex communication system.

The dialing mechanism comprises as its principal components a multivibrator 260 including transistors 261 and 265, a switch transistor 278 connected in series with the line and under control of the multivibrator 260, a variable capacitor 275 under control of pushbuttons (not shown), and a break switch 269 under control of the pushbuttons. There are ten values of capacitance under control of ten pushbuttons designated from 0 to 9, pressing one of the pushbuttons includes one of the values of capacitance represented by the variable capacitor 275 in the multivibrator 260 circuit. These same pushbuttons when pressed operate the switch 269 to open the contact 270 to turn on the multivibrator.

The operation of the dialing mechanism may be explained as follows: when the handset (not shown) is removed from the cradle the hookswitch represented by the contact 259 closes the loop circuit between the substa- the CP.5 and the CP1.5 pulses have not been shown. in its operated position).

Normally, the switch 269 is not operated and the contact 270 is closed. With contact 270 closed, the base electrode 264 of transistor 261 is held at the same potential as its emitter electrode 263, thus transistor 261 is held non-conductive. A negative potential will be applied through resistor 274 to the base electrode 268 of transistor 265, thus transistor 265 will be conductive. A negative potential also appears at the base electrode 279 of transistor 278 and transistor 278 will also be conductive.

Under these conditions the impedance path through resistor 277, emitter electrode 280 and collector electrode 281 of transistor 278 and resistor 282 (resistor 282 represents the D.C. impedance of the substation) is much less than the impedance through resistor 271 and the emitter electrode 267 and collector electrode 266 of transistor 265, and most of the current flow will follow this path. The above-mentioned loop circuit may thus be traced as follows: from negative battery in the central office line circuit LC11, resistors 243 and 244, one winding of transformer 210, over the line through the hookswitch 259, resistor 277, emitter electrode 280 and collector electrode 281, resistor 282, over the line to the line circuit LC11, through another winding of transformer 210, resistors 248 and 247, to ground. The potential at point 241 will be at approximately −5 volts at this time. If line gate multiplex pulses are present on leads T1 and U1, a −2 volts signal will appear at the output of gate 236 on lead E. If the voltage at point 241 comes more positive than −3 volts, there will be no output signal from the gate 236, due to the Zener diode 253*a*. The signal on the E lead indicates to the register control circuit 400 that the substation is requesting service, as will be explained.

When the subscriber at the substation presses a pushbutton (not shown), it will first place a capacitance 275 in the circuit, and then cause switch 269 to operate opening contact 270. When the contact 270 opens, transistor 261 will be rendered conductive, shorting the base electrode 279 of transistor 278 across resistor 282 and causing transistor 278 to be non-conductive. Capacitance 275 starts to charge up, drawing electrons from the base electrode 268 of transistor 265 and thus transistor 265 is rendered non-conductive. Transistor 265 will remain non-conductive until capacitance 275 is charged, at which time transistor 265 is again rendered conductive. When transistor 265 becomes conductive again, capacitor 272 will charge up, drawing electrons from the base electrode 264 of transistor 261, thus rendering transistor 261 non-conductive and transistor 278 conductive. The multivibrator 260 will continue to oscillate as long as switch 269 is operated holding contact 270 open. When the contact 270 is closed (the pushbutton is released) transistor 261 is held non-conductive and oscillations cease. The length of time that the multivibrator 260 remains in its second state of operation, i.e., that transistor 261 is conductive, depends on the value of capacitance 275 included in the circuit by pressing one of the ten pushbuttons. The value of capacitance 275 must be such that transistor 265 (during the time contact 270 is open) remains on for a time that is less than the interdigital pause, which for the present disclosure is equal to at least eight transmission cycles allowing the timer to reach state $\Omega$. The significance of this will be explained in the disclosure which follows.

During the time that transistor 278, is non-conductive the circuit through resistor 282 is open and the only current path is through the high-impedance path including the emitter electrode 263 and collector electrode 262 of transistor 261 and the resistor 276. Under these conditions the normal flow of direct-current will be much less and the voltage at the point 241 will be less than $-3$ volts. With the voltage something less than $-3$ volts, the Zener diode 253a will not conduct and there will be an absence of pulses on the E lead. The normal flow of direct-current over the line is therefore interrupted at a high-speed to provide variable-width direct-current supervisory signals to the register control circuits 400.

The table below shows the relationship between the sample time and the direct-current signal pulse width. In the table, $TC$=one transmission cycle.

| Signal No. | Signal width |
|---|---|
| 1 | $TC<X_1<2TC$ |
| 2 | $3TC<X_2<4TC$ |
| 3 | $5TC<X_3<6TC$ |
| 4 | $7TC<X_4<8TC$ |
| 5 | $9TC<X_5<10TC$ |
| 6 | $11TC<X_6<12TC$ |
| 7 | $13TC<X_7<14TC$ |
| 8 | $15TC<X_8<16TC$ |
| 9 | $17TC<X_9<18TC$ |
| 0 | $19TC<X_{10}<20TC$ |

The structure and function of the switching control circuits will now be described with reference to individual functional block diagrams.

The logic circuitry is direct-coupled (DC), that is, signals are represented by steady-state voltages. Two levels are employed. The first level is usually $-5$ volts, although other negative voltages are used in a few places, and represents the binary 1, true, on or active condition. The second level, ground potential, represents the binary 0, false, off or inactive condition. Flip-flops are used as registers with double-rail output signals to drive the logic circuits. A double-rail output is one in which both the logical 1 and 0 conditions are represented by active signals on separate leads. Only one of the two leads, however, has an active signal at any time. Logic circuits are included in each unit for controlling the setting of the flip-flops, which may be set 1 or set 0. "Set" when used alone "set 1," and "reset" is synonomous with "set 0." Also, an unprimed character represents a true or 1 condition and a primed character represents a false or 0 condition. These logic circuits comprise diode type AND and OR gates.

*Boolean Algebra*

In describing the logical operations performed by the circuits, Boolean algebra equations are used. In this notation the addition symbol signifies OR, and the multiplication symbol, expressed or implied, signifies AND, and the prime symbol signifies the inverted condition.

*Register Control Circuits*

The register control circuits 400 shown in FIGS 1 and 4 will now be described with reference to the functional block diagrams of FIGS. 7–9, and the logical operations performed by these circuits as individual units will be explained. Reference may also be made to the graph shown in FIGS. 10 and 11 which shows the operation of the various units during the scanning, seizure, dialing, and the establishing of a connection in a call.

In referring to the graph shown in FIGS. 10 and 11, it may be noted that only the time interval associated with one link during each transmission cycle is shown. The operation of each of the other links is similar and the operation of all of the links may be understood by observing only the one link, and the disclosure is greatly simplified. In addition, the pulses $A_1$–$A_4$ are shown as pulses of equal duration rather than as pulses of different duration, i.e., the pulses $A_1$ and $A_3$ are equivalent to a CP.5 pulse and the pulses $A_2$ and $A_4$ are equivalent to a CP1.5 pulse. Furthermore, to still simplify the disclosure, since the pulses $A_1$ and $A_3$ and the pulses $A_2$ and $A_4$ occur simultaneous with the CP.5 pulse and the CP1.5 pulses, respectively, applied sequentially to the calling and called party rows of the high-speed memory the CP.5 and the CP 1.5 pulses have not been shown. The presence of these pulses is to be understood, however, when reference is made to reading out a core during the pulse interval $A_1$ or $A_3$ or writing into a core during the pulse interval $A_2$ or $A_4$.

In describing the operation of the various units, the operations will be related to particular transmission cycles shown in the graph of FIGS. 10 and 11 by a note to the particular transmission cycle in a bracket, e.g., (TC9).

*Timing Circuit*

Figure 7:
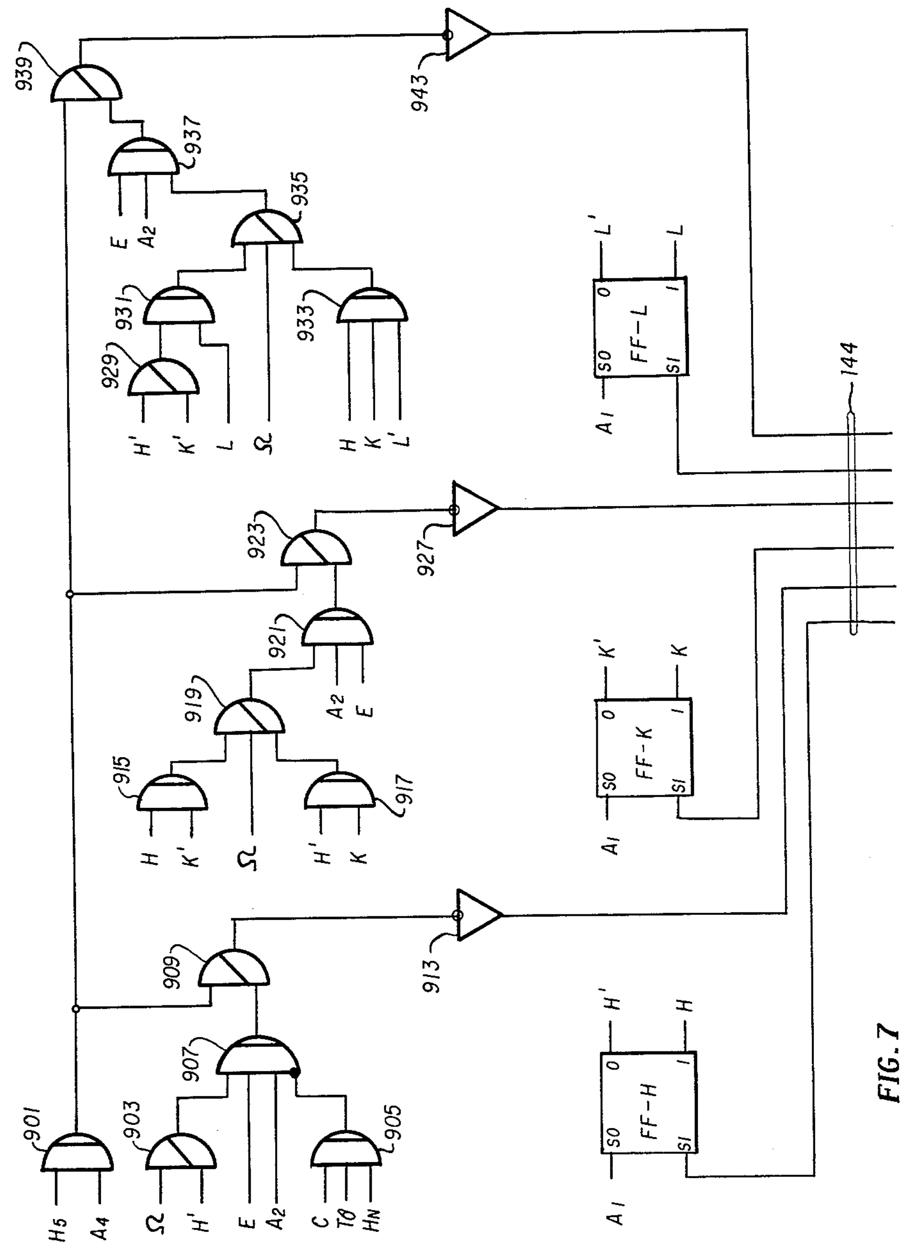
FIG. 7 is a functional block diagram of the timer.

The timing circuit shown in FIG. 7 is essentially a binary counter and includes three flip-flops FF–H, FF–K and FF–L and the associated columns of the high-speed memory 150. It may be noted that these columns only have cores in the calling party rows, i.e., the odd numbered rows, since the timer is controlled by the calling party. Since these flip-flops are shared on a time division basis by all of the links, each link having its own row of cores in the high-speed memory 150, the timer state of each link is independent from that of the others.

The logic equations for operation of the timing circuit are:

For writing into the memory cores:

$$h=(H'+\Omega)E(H_nT_0C)'A_2+H_5A_4$$
$$k=[HK'+H'K+\Omega]EA_2+H_5A_4$$
$$l=[L(H'+K')+KHL'+\Omega]EA_2+H_5A_4$$

For setting the timer flip-flops:

$H=S_n$
$H'=A_1$
$K=S_k$ $K'=A_1$
$L=S_1$ $L'=A_1$
$T_0=H'K'L'$
$F=H'KL$
$\Omega=HKL$ The operation of the timer circuit may be explained as follows: initially all of the timer flip-flops are set 0 (H', K' and L' are all true) and the timer is at $T_0$.

The timer flip-flops are set 0 by the lead edge of $A_1$ and are set 1 by the readout of the memory cores which will come slightly after the lead edge of $A_1$. The timer flip-flops will be registered for two successive time slots, i.e., the calling and called party time slots.

When E' is true during $A_2$ no cores will be written into. The first E pulse to appear coincident with $A_2$ for this row (TC7) will write into the $h$ core. One transmission cycle later, (TC8), during $A_1$ core $h$ will be readout and flip-flop FF–H will be set 1. Since H will now be true during $A_2$, $h$ core cannot be written into again but $k$ core will be since the equation HK'E is true.

A study of the equations will show that at the end of eight successive E pulses (TC7 to TC14), HKL, and thus $\Omega$, will be true. As long as E reappears during $A_2$, $\Omega$ will be true and the timer will stay in this condition. Once E does not appear (E′ true) during $A_2$, however, the timer will return to $T_0$ no matter what the state of the timer was at the time.

A more detailed explanation of this timer operation is as follows: as previously stated, initially all of the timer flip-flops are set 0 (H′, K′ and L′ are all true) and the timer is at $T_0$.

Whenever E′ is true during $A_2$ there will be no output from the gates 909, 923 and 939, thus none of the memory cores associated with the timer circuit will be written into.

It may be noted that the gate 905 is arranged to inhibit the gate 907 whenever $CT_0H_n$ is true, i.e., whenever $CT_0H_n$ is true the output from the gate 905 will inhibit the gate 907 and there will be no output from the gate 907. If $CT_0H_n$ is not true, however, gate 905 will have no effect on gate 907, and if E and H′ or $\Omega$ are true there will be an output from gate 907.

When E first appears coincident with $A_2$ (TC7) the signal on the E lead is gated through the gates 907 and 909, and core *h* is written into. During the next transmission cycle (TC8) the leading edge of the $A_1$ pulse sets FF–H false. Flip-flop FF–H is set 1, however, shortly thereafter when the *h* core is readout. In the explanation which follows this operation, i.e., the flip-flops being set 0 by the leading edge of $A_1$ and set 1 shortly thereafter by the readout of the core associated with the flip-flop, will be assumed and not restated each time. Also, on the graph shown in FIGS. 10 and 11 the state of the flip-flops are shown as continuous rather than trying to differentiate between these two operations since the time interval is very short.

During the $A_2$ pulse of this transmission cycle (TC8) core *h* cannot be written into since H is now true and the input to gate 903 is false. The *k* core will be written into, however, since HK′ is true at the input to gate 917 and $EA_2$ is true at the input to gate 921. The *k* core is readout and the flip-flop FF–K is set 1 during the next $A_1$ pulse (TC9). Also, the flip-flop FF–H is set 0 during this $A_1$ pulse.

The succeeding $A_2$ pulse, since H′ is true at the input to gate 903 and H′K is true at the input to gate 917 the signal on the E lead is gate through the associated gates and both the *h* core and the *k* core are written into. During the $A_1$ pulse of the following transmission cycle (TC10) both flip-flop FF–H and FF–K are set 1 when the *h* and *k* core are readout. Also, since H and K are now both true during $A_2$ the input to gates 933 and 935 will be true (HKL′ true) and the inputs to the gates 937 and 939 will all be true and the *l* core will be written into. Flip-flops FF–H and FF–K will be set 0 and the flip-flop FF–L will be set 1 during the following $A_1$ pulse (TC11).

During the $A_2$ pulse (TC11) the *h* core will be written into again and also the *l* core since H′ is true at gate 903 and at gate 929. The *k* core is not written into since neither HK′ or H′K is true at the input to gates 915 and 917.

When the *h* and *l* cores are readout during $A_1$ (TC12) flip-flops H and L are again set 1, and during $A_2$ the *k* and *l* cores are written into but the *h* core is not (HK′ is true at gate 915 and K′ is true at gate 929). During the $A_1$ pulse (TC13) the cores *k* and *l* are again readout to set flip-flops FF–K and FF–L true. During the following $A_2$ pulse all of the cores *h*, *k*, and *l* will be written into since now H′ is true at gate 903, H′K is true at the gate 917, and H′ is true at the gate 929.

It may also be noted that at this time (TC13) when H′KL is true that the timer state will advance to F. The significance of this timer state will be explained in relation to the sequence circuit during the discussion of the sequence circuit.

During the next $A_1$ pulse (TC14) all of the flip-flops FF–H, FF–K and FF–L will be set 1 when the *h*, *k* and *l* cores are readout. With HKL true the timer advances to $\Omega$. Each of the cores *h*, *k* and *l* will be written into during each succeeding $A_2$ pulse as long as E continues to appear during $A_2$ since the input to gates 903, 919 and 935 will be true as long as $\Omega$ is true. And $\Omega$ will be true as long as E remains true.

*Sequence Circuit*

Figure 8:
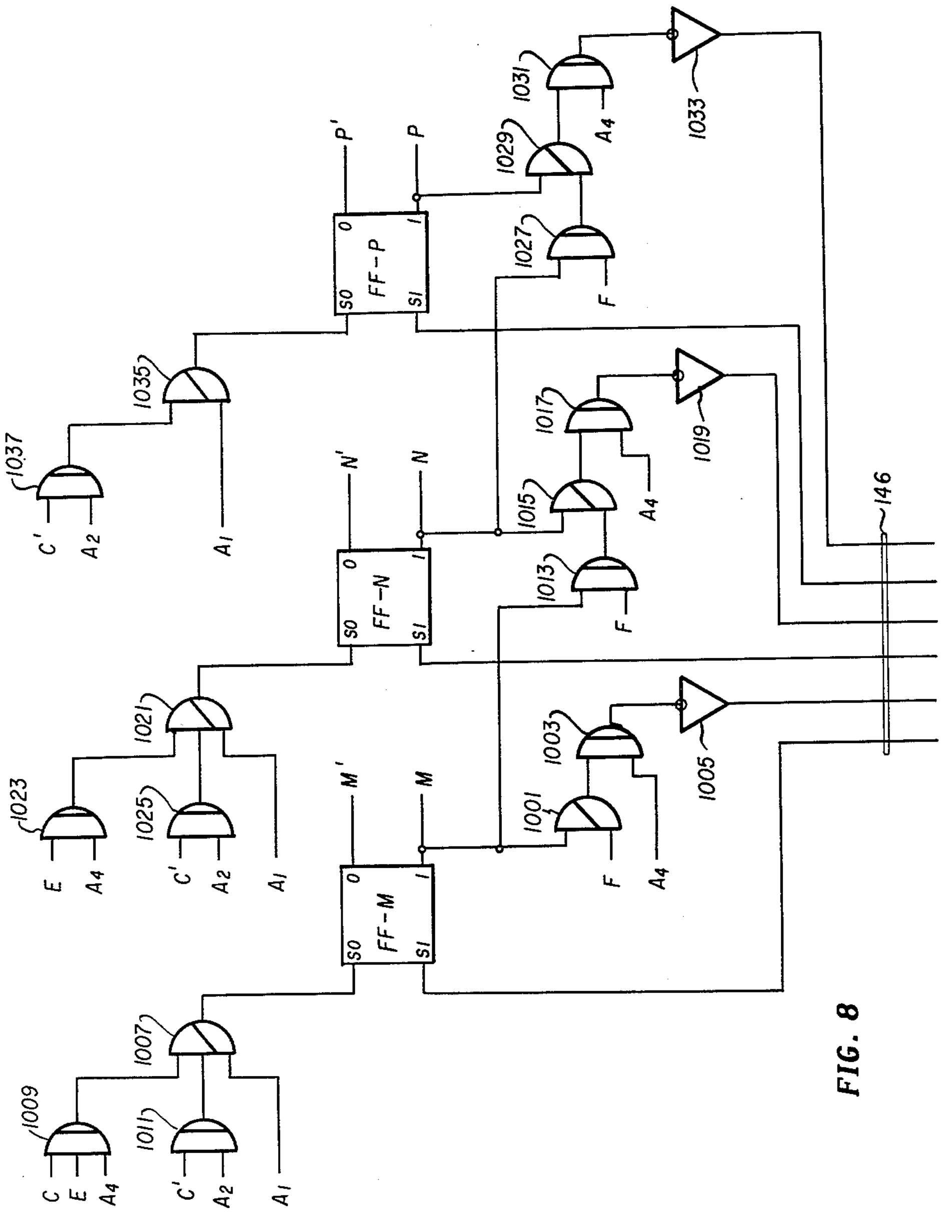
FIG. 8 is a functional block diagram of the sequence circuit.

The sequence circuit shown in FIG. 8 includes three flip-flops FF–M, FF–N and FF–P and the associated columns of the high-speed memory 150. These flip-flops also are shared on a time division basis by all of the links and the sequence state of each link is independent from that of the others.

It may be noted that the columns associated with the sequence circuit only have cores in the calling party rows, i.e., the odd numbered rows. Furthermore, these cores are threaded by the read winding associated with the calling party row but rather than being threaded with the ½-write winding associated with the calling party row they are threaded with the ½-write winding associated with the called party rows, i.e., the even numbered rows. This allows the information stored in these cores to be read out to the register control circuits with the calling party read pulse, analyzed and altered if necessary, and to be rewritten into these cores during the called party ½-write pulse, thus the flip-flops associated with these columns are set for 2 time slots.

The logic equations for the sequence circuit are:

For writing into the memory cores:

$$m=(F+M)A_4$$
$$n=(FM+N)A_4$$
$$p=(FN+P)A_4$$

For setting the sequence circuit flip-flops:

$$M=S_m$$
$$M'=CEA_4+C'A_2+A_1$$
$$N=S_n$$
$$N'=EA_4+C'A_2+A_1$$
$$P=S_p$$
$$P'=C'A_2+A_1$$

Sequence states:

$H_n=M'N'P'$ (normal)
$H_1=MN'P$ (seizure or tens advance)
$H_2=MNP'$ (units advance)
$H_3=MNP$ (ringing)
$H_4=M'NP$ (busy)
$H_5=M'N'P'$ (conversation)

It may be noted by reference to FIG. 8, the logic equations and to the graph shown in FIGS. 10 and 11 that the sequence state can be advanced only when the timer state reaches $\Omega$ (TC14). The timer can reach $\Omega$ only when E is true during $A_2$ for 8 consecutive transmission cycles, and this condition occurs only after seizure or during the interdigital pause, this will be subsequently explained.

When the timer reaches state F (TC13), as previously explained, during the $A_4$ pulse of that transmission cycle core *m* will be written into since the input to gates 1001 and 1003 will both be true. The following transmission cycle (TC14) during $A_1$ flip-flop FF–M is set true, and the sequence state advances from $H_n$ to $H_1$. It will be observed that once a core is written into it will continue to rewrite every transmission cycle unless the flip-flop is reset after readout and before write-in. The conditions when this occurs is shown in the equations.

During this same transmission cycle (TC14) the timer advances to state $\Omega$, as previously explained, and will remain at $\Omega$ until E′ becomes true during $A_2$.

When the sequence circuit has advanced to $H_1$ the called party's number may be dialed. The subscriber at the substation presses any pushbutton and the loop circuit will be effectively opened and closed as long as the pushbutton is pressed, as previously explained. The period of time that the loop circuit is effectively open will depend on the pushbutton pressed. Since the period between the pulses, i.e., the time that the multivibrator remains in its second state effectively closing the loop circuit, is set and will never be greater than six transmission cycles the timer cannot reach Ω and the sequence circuit will not advance.

When the subscriber has dialed the first digit (the registration of the digit dialed will be subsequently explained during the description of the operation of the line number advance circuit) and releases the pushbutton the loop circuit is again effectively closed and will remain closed for at least eight consecutive frames. It was found during numerous experiments with the pushbutton dial that it was practically impossible for a subscriber to release one pushbutton and press another one in an interval of time less than the required eight transmission cycles which is used to indicate an interdigital pause.

If E is true for eight consecutive transmission cycles (TC19 to TC26) the timer will again advance through F to Ω. When the timer reached F (TC25) and M is true the *n* core is written into during the $A_4$ pulse, since the input to gates 1013, 1015, and 1017 will all be true. After the timer reaches Ω (TC26) the next transmission cycle (TC27) the *n* core is read-out during $A_3$ and the flip-flop FF–N is set true. Flip-flops FF–M and FF–N will both now be true and the sequence state will advance to $H_2$. The subscriber may now dial the second digit, the operation of the timer and sequence circuit being essentially the same.

When the subscriber releases the pushbutton after the second digit is dialed the timer again advances through F to Ω (TC32 to TC39). When the timer reaches F (TC38) the *p* core will be written into during $A_4$ since the input to gates 1027, 1029 and 1031 will all be true, and flip-flop FF–P will be set true during the following $A_3$ pulse (TC39) when the core is readout. When P is true along with M and N the sequence state advances to $H_3$.

If the called line is busy (the conditions existing if the called line is busy is shown during TC40 to TC42) E and C will both be true during $A_4$ and flip-flop FF–M will be set 0 since the input to gates 1009 and 1007 will be true. When M′ becomes true the sequence state will advance to $H_4$ (TC40) and a busy signal will be transmitted to the calling subscriber. When the calling party hangs-up and C′ becomes true during $A_2$, flip-flops FF–M, FF–N and FF–P will all be set false since the inputs to gates 1011, 1007, 1025, 1021, 1037 and 1035 will all be true, and the sequence state will advance to $H_n$ (TC42).

If the called line is not busy the sequence will remain in $H_3$ (TC43), signal the called partly and mark his line as busy during ringing, C true. When the called party answers E will become true during $A_4$ (TC44) and flip-flops FF–N and FF–M will be set 0 since the input to gates 1009, 1007, 1023 and 1021 will all be true. The sequence state advances to $H_5$ (TC40) and the connection will be complete.

When the calling party hangs-up the busy mark will no longer be held and C will no longer be true. When C′ becomes true flip-flops FF–M, FF–N and FF–P will all be set 0 during $A_2$ since the inputs to gates 1011 and 1007, 1025 and 1021, and 1037 and 1035 will all be true, and the sequence state will advance to $H_n$ (TC47).

*Busy Circuits*

Figure 9:
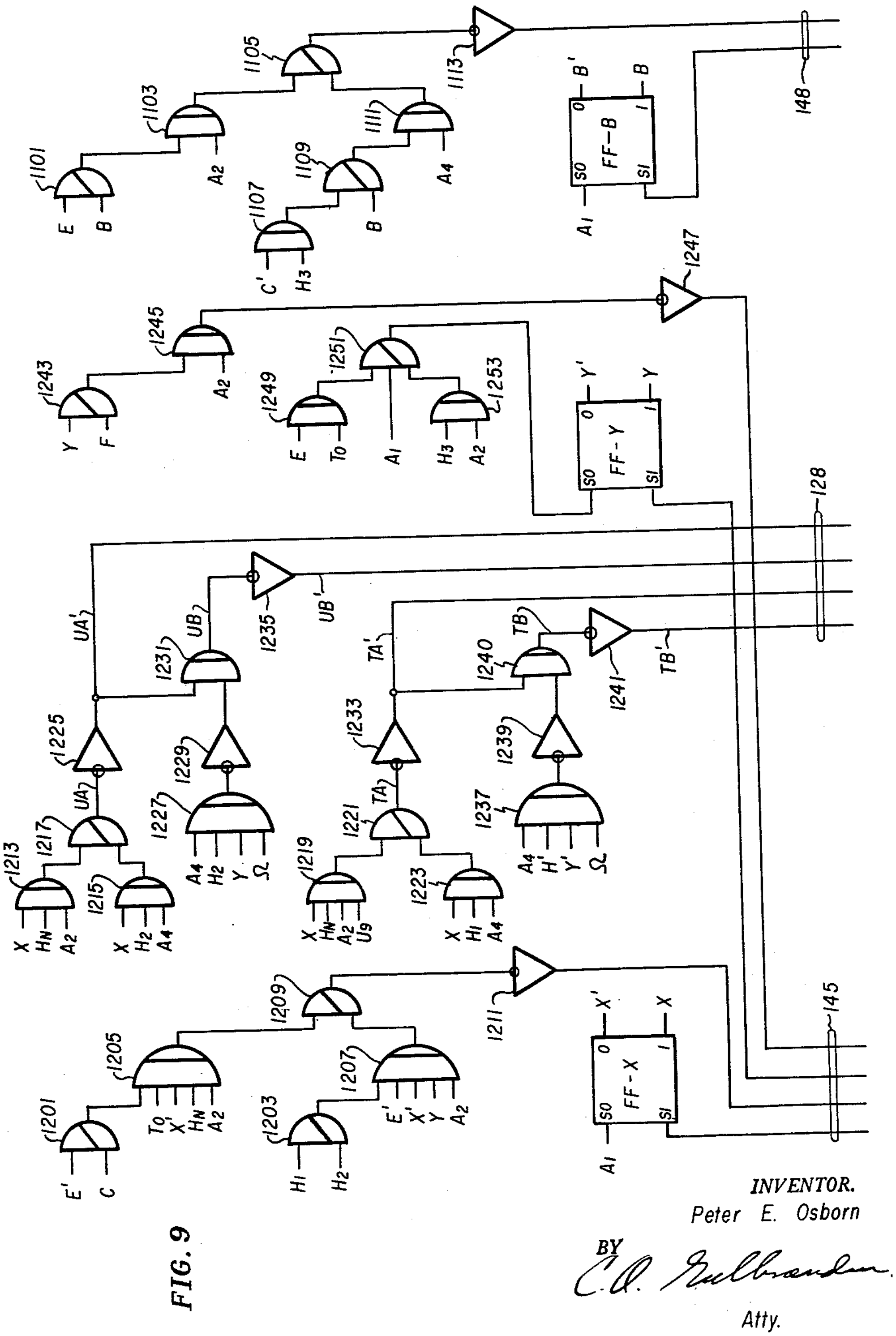
FIG. 9 is a functional block diagram of the line number advance circuit, and the busy circuit.

The busy circuit is shown in FIG. 9 and includes the flip-flop FF–B and the associated column of the high-speed memory 150. The flip-flop is also shared on a time division basis by each of the links, and the state of each link is independent from that of the other.

A busy mark must appear on each line circuit within two microseconds and be such that one input pulse will hold it on for a minimum of 80 microseconds. As previously stated, when the line circuit is in use the first pulse to appear on lead E is supplied to the gate 234 via a two microsecond delay line, the gate 236*a*, and a pulse stretching device 234*a*, which may be, for example, a monostable multivibrator, designed to provide an output signal for at least a minimum of 80 microseconds, or one transmission cycle. The first pulse appearing on the lead E must be delayed for two microseconds to allow the *h* core associated with the flip-flop FF–H of the timer circuit to be written into. If the pulse was not delayed and the pulse appeared on lead C during the same interval $H_nT_0C$ would be true at the input to gate 905 and the gate 907 would be inhibited preventing the *h* core from being written into.

The busy signal C must, however, appear true within two microseconds after E first becomes true to prevent the line from being seized by more than one idle link which is scanning.

Furthermore, once the line is seized by an idle link the busy mark must be provided during dialing. Since E′ will be true during dialing, and may be true for longer than 80 microseconds, further provisions must be made for maintaining C true during dialing to prevent it from being seized by another calling line. The busy marking flip-flop FF–B prevents this from happening. The signal B will become true one transmission cycle after E becomes true and will remain true during each time interval associated with this calling link. The opertaion of the busy circuit may be better understood by observing the logic equations which are:

For writing into the *b* core:

$$b=(E+B)A_2+(H_3C'+B)A_4$$

For setting the flip-flop FF–B:

$$B=S_b$$
$$B'=A_1$$

Referring now to FIGS. 2 and 9 the operation of the busy circuit will be explained. When the line circuit is in use the first pulse to appear on lead E will be supplied to the gate 234, after a two microsecond delay, as previously explained. In addition, since E is true during $A_2$ the input to gates 1101, 1103, and 1105 will all be true and the *b* core will be written into. The following transmission cycle the *b* core will be readout during $A_1$ and the flip-flop FF–B will be set true. The inputs to gate 237*a* will all be true when the line circuit LC11 is scanned, $T_nU_nB$ are all true, and the output is supplied through the gate 236*a* to the pulse stretching device 234*a* to again set its output true for another 80 microseconds. The output of the device 234*a* is supplied to the gate 234 and since $T_nU_n$ is true, C will be true at the output of gate 234. If E is still true the device will also be set after the two microsecond delay from the signal on the lead E.

It may be noted that once B becomes true the core *b* is written into during $A_2$ and the flip-flop FF–B will be set true during each cycle until it is reset. If now E′ becomes true during dialing the pulse stretching device 234*a* will be set during each cycle since the inputs to gate 237*a* will be true and will provide an output to the gate 234.

If the sequence advances to $H_3$ (busy test and ringing) and the called party's line circuit is idle it must be marked busy during ringing to prevent it from being seized by a second calling line. When the sequence advances to $H_3$ during $A_4$ the *b* core of the called party's memory row will be written into since the inputs to gates 1107, 1109, and 1111 will all be true, and the following transmission cycle during $A_3$ the flip-flop FF–B will be set true. Thereafter, whenever the called party's line gate multiplex pulses $T_nU_n$ appear the inputs to its gate 237*a* will all be true and the pulse stretching device similar to the pulse stretching device 234*a* will be set and the busy signal C will be true.

*Line Number Advance Circuit*

The line number advance circuit shown in FIG. 9 includes two flip-flops FF–X and FF–Y and the associated columns of the high-speed memory 150. These flip-flops like the flip-flops in the timer circuit and the sequence circuit are also shared on a time division basis by all of the links and the line number advance of each link is independent from that of the others.

The line number advance circuit determines whether the tens register 1300 and the units register 1302 in the line number register 130 will advance, rewrite, or clear for a link during its logic cycle. The line number register is controlled for both line finder action of an allotted link scanning for a calling line, and connector action of registering a called number during dialing. Since during a link's logic cycle, $A_2$ coincides with the calling line and $A_4$ coincides with the called line, those gates in FIG. 9 which relate to line finder action have an $A_2$ input, and those which relate to connector action have an $A_4$ input.

The logic circuits in the line number register 130 are designed to use inverted signals; therefore, the output signals from the line number advance circuit 1200 are also in inverted form. The output amplifiers 1225, 1233, 1235 and 1241, as well as the amplifiers 1229 and 1239, perform the functions of both amplifying signals and inverting them. The signals TA and UA are for tens advance and units advance respectively, and the signal TB and UB are for tens rewrite and units rewrite, respectively. The output is normally in a condition for rewrite, that is, TA and UA are at ground so that TA' and UA' are at a negative potential, and TB and UB are at a negative potential so that TB' and UB' are at ground.

The logic equations for the line number advance circuits are:

For setting the memory cores:

$$Y=(F+Y)A_2$$
$$x=H_nT_0X'(E'+C)A_2+YE'X'(H_1+H_2)A_2$$

For setting the line number advance flip-flops:

$$Y=S_y$$
$$Y'=ET_0+H_3A_2+A_1$$
$$X=S_x$$
$$X'=A_1$$

For tens and units advance:

$$U_a'=[XH_nA_2+XH_2A_4]'$$
$$U_b'=[U_a'(A_4H_2Y\Omega)']'$$
$$T_a'=[XH_nU_9A_2+XH_1A_4]'$$
$$T_b'=[T_a'(A_4H'Y'\Omega)']'$$

A scanning link, that is one in which the sequence circuit has the normal output $H_n$, controls the line finder advance by means of gates 1213 and 1219. The units may advance in any logic cycle, while the tens may advance only if UC–1 and UF–1 (code for U9) from the units register 1301 are true. Advance occurs if the scanned line is on hook or busy since either E' or C will be true and the *x* core will be written into and FF–X subsequently will be true at the input to gate 1213.

For connector action, gate 1223 produces a tens advance once each transmission cycle occurring in the time of the first dial pulse during the dialing of the tens digit with the sequence in its $H_1$ state, and the gate 1215 permits the advance once each transmission cycle occurring in the time of the first dial pulse during the dialing of the units digit with the sequence in its $H_2$ state.

The tens rewrite signal is inhibited whenever the tens advance signal appears by applying the inverted signal from lead TA' to gate 1240; and similarly the units rewrite is inhibited by the units advance by connecting the inverted signal from UA' to gate 1231. The rewrite may also be inhibited by the connector without an advance signal to clear the register. The connector supplies the clearing signal at gate 1237 when the sequence advances to $H_1$ before the beginning of the tens digit, with Y and $\Omega$ true; and at gate 1227 when the sequence has advanced to $H_2$ before the beginning of the units digit, with Y and $\Omega$ true. The output of gate 1227 is inverted by amplifier 1229 and applied to AND gate 1231; and the output of gate 1237 is inverted by amplifier 1239 and applied to AND gate 1240.

The detailed operation of the line number advance is as follows: assuming an idle link the sequence state is at $H_n$ and the timer is at $T_0$, as previously explained. A line is sampled during $A_2$ (TC1) and if the line is idle E' will be true. Core *x* will be written into since the input to gates 1201, 1205 and 1209 are all true. The following transmission cycle during $A_1$ (TC2) core *x* is readout and the flip-flop FF–X is set 1. During $A_2$, since X is now true, core *x* cannot be written into again. At the output of gate 1217 (the units advance gate $U_a$) and output signal will appear since $XH_nA_2$ are all true at the input to gates 1213 and 1217. The signal is inverted by amplifier 1225 to provide $U_a'$. Gate 1231 is now inhibited and the units rewrite signal will be false. If the units number that had been sampled was $U_9$ then the tens number will advance also since the input to gates 1219 and 1221 are also true, the output signal again being inverted by amplifier 1233 to provide $T'_a$.

The next transmission cycle (TC3) X' will be true and the advanced number wil be readout of the cores. If this number is also idle, core *x* will again be written into, and the cycle will continue.

If a line is sampled that is busy in some other time slot then the busy mark C on that line will be true. Since C is true the line number will continue to advance even though E is true for the input to gates 1201, 1205 and 1209 will still be true. Also the timer will not advance if the line sampled is busy since core *h* cannot be written into when $CT_0H_n$ is true at the input to gate 905.

When the calling party row is advanced to a number that is waiting to be seized, E will be true and during $A_2$ (TC7) the *h* core will be written into, as previously explained. The core *x* can no longer be written into while the sequence remains at $H_n$ for E is true. When E has appeared for eight consecutive transmission cycles (TC7 to TC14) the timer will have advanced through F to $\Omega$. When the timer reached F (TC13) the core *y* was written into during $A_2$ for the input to gates 1243 and 1245 were both true, and during the succeeding $A_2$ (TC14) pulse flip-flop Y was set 1. Also, when the timer reached $\Omega$ which was at the same time Y became true the sequence state advanced to $H_1$. Since the sequence circuit will not return to normal until the calling party hangs-up and C is no longer true, the calling party registration cannot advance any further.

It may also be noted that when $\Omega$ and Y both become true and the sequence state advanced to $H_1$ the rewrite pulse is inhibited at gate 1240 during $A_4$, the signal from gate 1237 being inverted by amplifier 1239. This allows the tens register 1300 in the line number register 130 to be cleared in preparation for the first digit.

When the subscriber at the calling substation presses a pushbutton, E will no longer be true (E' true), as previously explained. Since Y is true and E' is now true (TC16) the input to the gates 1203, 1207 and 1209 will be all true during $A_4$ and core *x* will be written into. One period later (TC17) *x* core will be readout during $A_1$ and flip-flop FF–X will be set 1. A tens advance pulse will be transmitted during $A_4$ when the input to gates 1223 and 1221 are all true. Core *x* will not be written into during this transmission cycle for X is true. If E has not become true during the next transmission cycle (TC18) core *x* will again be written into and the following transmission cycle (TC19) will produce another tens advance pulse, thus there will be a tens advance pulse every other frame that E' is true during $A_4$.

Once E' is true when the subscriber presses a pushbutton the timer will advance to $T_0$ since the cores *h, k* and *l* cannot be written into and will remain there until one transmission cycle after E becomes true again. The first E pulse to appear (TC19) will set Y' true since the input to gates 1231 and 1233 is true. This primes the timer and Y cannot become true again until the timer reaches F which requires seven consecutive E pulses during $A_2$, and this cannot happen until the subscriber releases the pushbutton. Since Y is no longer true X cannot become true and the tens can no longer advance.

During the iterdigital pause the timer will advance through F to Ω, setting core *y* and advancing the sequence state to $H_2$. The next digit will cause the units to advance since now $XH_2A_4$ is true and $XH_1A_4$ is false.

When the pushbutton is released by the subscriber the timer will again advance through F to Ω, setting core *y*, and advancing the sequence state to $H_3$ for at least one frame. When the sequence state reaches $H_3$, Y will be set Y' during $A_2$ since the input to gates 1235 and 1233 is now true. Any additional signaling by the subscriber will have no effect since core *y* can no longer be written into source $H_1$ or $H_2$ is required and the sequence state cannot return to $H_n$ until the calling party disconnects, removing the busy mark.

OPERATION

*Transmission*

The transmission, line, and link circuits are shown in FIGS. 2 and 3. The principal portion of the transmission line ML1–ML2 comprises a multiplex conductor TL having one end TL1 connected in multiple to the transmission gates of all the line circuits, and having its other end TL2 connected in multiple to the transmission gates of the link circuits and the signaling circuits. This conductor extends through the transmission control unit 110 with windings of transformers 361 and 362 in series. This conductor TL extending from the line circuit transmission gates to the link circuit transmission gates is referred to herein as the highway. The transmission arrangement is of a type which provides two-way transmission over the same highway and the same time channel, as covered by A. H. Faulkner in his U.S. patent application, Serial No. 764,979, filed October 2, 1958, now Patent No. 2,987,577, for a Time Division Multiplex System; and generally similar to the arrangement shown in his U.S. Patent No. 2,854,516 and his copending applications, Serial No. 530,085, filed August 23, 1955, now Patent No. 2,931,863; and Serial No. 707,298, filed January 6, 1958, now Patent No. 3,041,400. The transmission gates connected to the end TL1 of the highway, such as gate TG1 in line circuit LC11, each includes a storage capacitor 220, a PNP transistor 224, a diode 221 connected between the collector electrode of the transistor and the storage capacitor, and a diode 222 connected between the collector electrode of the transistor and conductor TL1, each of the diodes being poled with its anode connected to the collector electrode of the transistor. Each of the transmission gates connected to the end TL2 of the highway, such as gates TG2 and TG3 in link LK1, are similar to gate TG1 except that the transistors are of the NPN type, and the diodes connected to the storage capacitors and to the conductor TL2 are poled with their cathodes connected to the collector electrode of the transistor. The control pulses are supplied by special gate circuits 320 and 322 which supply inverted output pulses when the inputs are all true. Each of the transmission gates at each end of the highway also includes biasing circuit elements connected to appropriate direct-current potential sources. Because of the similarity of the link circuit transmission gates to the line circuit transmission gates, except for the polarity of the circuit elements and the value of the biasing potentials, they are not shown in detail.

For an explanation of the operation of the multiplex transmission system, assume that gates TG1 and TG2 have been effectively connected by time channel 1, the gates being supplied with coincident control pulses in time slot 1, to gate TG1 on lead 251 and to gate TG2 on lead 324. Constant current flows from the collector circuit of transistor 224 through diode 221 into condenser 220, causing the potential to change at a linear rate. A similar action occurs in gate TG2. Without the transmission control unit 110, the potential at the two gates would change linearly until the potentials at the two gates became equal. Then the current would be diverted to flow from the collector of transistor 224 through diode 222 and over the highway into gate TG2 for the remaining duration of the control pulse applied to the two gates. At the end of the time slot, the two condensers would be at substantially the equalization potential. During the interval between pulses, current flow through diode 221 of gate TG1 is blocked, but the potential of condenser 220 changes slowly because of current flow into the audio portion of the circuit. Similarly, the potential at gate TG2 changes in the opposite direction. The values of the various circuit elements and bias potentials are so chosen with relation to the timer intervals that with no modulation the diversion of the current over the common highway occurs a the center time position of each control pulse. When modulation is applied at either gate, the timer psition within the control pulse at which the curren is diverted is shifted in proportion to the amplitude of the modulaion. Thus, two-way transmission is obtained in the same time channel over the same common highway.

In the line circuit, the audio coupling between the subscriber line and the transmission gate includes a transformer 210, an impedance converter comprising a transistor 212 shunted by a resistor 214, and a filter choke 216. The choke 216, in conjunction with the condenser 220, filters the pulse repetition frequency from the audio signal. The impedance converter is provided to obtain a high-impedance at a low power level in the multiplex circuit with a low-impedance at a high power level across transformer 210. For signal flow from the transmission gate to transformer 210, the transistor 212 is connected as an emitter follower to give a power gain with an impedance step down, while for signal flow from transformer 210 to the transmission gate the resistor 214 is provided to obtain the desired impedance ratio. In the link circuit, the inductors 314 and 315 provide audio frequency coupling between the transmission gates TG2 and TG3. A bias potential is applied to the junction of these two inductors through a high-impedance inductor 318. The connection to another subscriber line is completed in a different time channel through transmission gate TG3, the common highway, and the line circuit of the other line.

The operation of the transmission system is modified by the insertion of the transmission control unit 110 in the common highway, as disclosed in the Faulkner Patent 2,987,577. The output of a sawtooth generator 364 is coupled into the highway through a transformer 361. This generator is controlled by the pulses on lead CP.5 to provide a voltage on the highway which varies linearly during the 1.5-microseconds interval of each time slot which is provided for transmission, and recovers during the 0.5-microsecond guard interval. The effect of this sawtooth voltage is to increase the deviation of the timer position at which current commences to flow over the common highway, thereby reducing the transmission loss or even providing gain, as may be understood by reference to the said Faulkner et al. patent.

A circuit including a transmission control conductor T–C in the multiplex lines ML1 and ML2 is provided to limit the duration of the current flow over the highway to a small fraction of each time slot. This conductor is connected in multiple as an input to AND gates through which the control pulses are supplied to all of the transmission gates, such as gates 232, 320, and 322 associated with transmission gates TG1, TG2, and TG3 respectively. Initially, during the 1.5-microseconds control pulse interval of each time slot, the signal on conductor T–C is true to enable these AND gates and permit control pulses to be applied to the selected transmission gates. When the current commences to flow over the highway, a signal is applied through a transformer 362 and a trigger circuit 365 to set the flip-flop 366 to 0. The voltage on conductor T–C, which is connected to the output "1" of the flip-flop 366 then becomes false and therefore disables the AND gates to terminate the control pulses to the transmission gates. During the guard interval, the pulse on conductor CP.5 resets the flip-flop 366.

The transmission control unit 110 also includes a clamp circuit 363 for reducing cross talk by clamping the highway during the guard interval responsive to the pulse applied from lead CP.5.

The line circuit LC11 is controlled by coincident pulses on leads T1 and U1 of line 134 from the line number register 130 (FIGS. 1 and 5). These two leads are connected as inputs to each of the AND gates 232, 234, 236 and 238 of the line circuit. At gate 232, coincidence of the T1 and U1 pulses, in conjunction with the signal on lead T–C, controls the supply of control pulses on lead 251 to transmission gate TG1. The collector bias circuit of the transistor 212 of the impedance converter includes a condenser 218 shunting a resistor 219. When a train of pulses appears at lead 251, the operation of the transmission gate TG1 causes current flow through transistor 212 and thereby charges condenser 218 to a negative potential with a certain predetermined time constant.

*Switching Control*

The operation of the control circuits in establishing the connection between two local lines will be described with reference to FIGS. 1–9, and the graph in FIGS. 10 and 11. The figure number in which individual gates are shown may be determined from the portion of the reference character preceding the last two digits.

*Line Finder Action*

Usually several links will be idle, and therefore, in the normal sequence state $H_n$, and scanning. The timer state will also be at $T_0$. For the purpose of our disclosure assume that link 1 is scanning and that the time interval DP1 of each transmission cycle associated with link 1 is the time interval shown in the graph in FIGS. 10 and 11.

The transmission cycles TC1 to TC7 illustrate the line finder action during DP1. During DP1 of each transmission cycle the tens register 1300 and the units register 1302 of the line number register 130, will supply one tens output and one units output to pulse one of the line circuits. The line circuit may or may not supply pulses to either or both of the leads E and C, depending upon its condition.

During DP1 of the transmission cycle TC1 (hereafter it will be assumed that each time interval referred to is DP1 and reference will only be made to the transmission cycle in which action referred to takes place) the number registered in row 1 of the high-speed memory 150 will be readout to the line number register 130, translated, and supplied to the leads T and U to pulse one of the line circuits. Assume that the number readout is 08.

In the line number advance circuit 1200 if the line circuit 08 is idle E' will be true at the input to gate 1201 and $T_0$, X', $H_n$, $A_2$ will all be true at the input to gate 1205. The output signal from gate 1209 is amplified by the amplifier 1211 to write into core *x*. It may be best to again mention that the pulses $A_1$ and $A_2$ and the pulses $A_3$ and $A_4$ occur simultaneously with the pulses CP.5 and CP1.5, respectively, applied to the memory rows, and that the CP.5 and the CP1.5 pulses are not shown but their presence is to be assumed. During TC2, the core *x* is readout during $A_1$ and flip-flop FF–X is set 1; during $A_2$ the units register 1302 will receive a units advance pulse $U_a'$ since $XH_nA_2$ will be true at the input to gate 1213 and the rewrite pulse $U_b'$ will be inhibited with $U_a'$ true at the input to gate 1231. The *x* core will not be written into again at this time since X' is false at the input to gate 1205.

During TC3, the flip-flop FF–X is set zero by the leading edge of $A_1$ and the number now registered (09) is readout of the memory cores. If E' is still true during $A_2$, core *x* will again be written into since X' is now true. The input to gate 1213 is false since X' is true thus the units advance pulse $U_a'$ will not be supplied to the units register 1302. The rewrite pulse $U_b'$ will be, however, since the gate 1231 is not inhibited and the number 09 will be rewritten in the cores.

During TC4, core *x* will be readout during $A_1$ and the flip-flop FF–X will be set 1 and during $A_2$ the units register 1302 will again be advanced since the inputs to gate 1213 will all be true. With $U_a'$ true the rewrite pulse $U_b'$ is again inhibited at gate 1231. Also, since the number readout of the cores was 09 the line number register 130 will supply a pulse on the leads UF–1 and UC–1 ($U_9$ is the code for these signals in use at the gates). The inputs to gate 1219 will now all be true and a tens advance pulse $T_a'$ will also be supplied to the tens register 1300. The rewrite pulse $T_b'$ is inhibited with $T_a'$ true at the input to gate 1240.

During TC5, flip-flop FF–X is again set 0 with the leading edge of $A_1$ and cores are readout to the line number register 130. If E' is still true during $A_2$ the *x* core will again be written into, as described.

During TC6, the number 10 now registered in the cores is readout during $A_1$, and the flip-flop FF–X will be set 1 since the *x* core was written into during the preceding transmission cycle. The inputs to gate 1213 will again be true and a $U_a'$ pulse will be supplied to the units register 1302 and to the gate 1231 to inhibit the rewrite pulse $U_b'$. Core *x* is not written into during $A_2$ since X is now true at the gate 1205.

Assume now that the subscriber at station S11 lifts his handset to initiate a call, and that he wishes to call station S22. Then in the line circuit LC11 the signal on conductor 253 becomes true. Lead 254 is in the true condition except during ringing. During TC7, when the cores are readout during $A_1$ the line number register 130 will supply pulses on the leads T1 and U1 since the number now registered is 11. The inputs to the gate 236 will all be true and the output pulse from gate 236 will be applied to the conductor E, and the register control circuits 400. The signal on conductor E is also supplied to the gate 234 via the two microsecond delay line **239*a*, the gate 236*a*, and the pulse stretching device 234*a***.

Prior to the time the subscriber removed his handset to initiate a call E was false at the input to gates 907, 921 and 937 in the timer circuit 900 and therefore none of the cores were written into and the timer remained at $T_0$. The sequence also remained at $H_n$ since the timer must advance to state F before the cores associated with the sequence circuit flip-flops are written into.

The first time that E is true during $A_2$ (TC7) the *h* core associated with the sequence flip-flop FF–H is written into since the inputs to gates 903, 907 and 909 are now all true, and the calling line is seized. Also, when E is true during $A_2$ the inputs to gates 1101, 1103, and 1105 will all be true and the *b* core is written into.

The line number advance 1200 will not provide any more advance pulses since E' is now false at the input to gate 1201 and the *x* core cannot be written into and thus flip-flop FF–X cannot be set 1. C is not true for at least two microseconds after E becomes true and by the time C is true during the next transmission cycle the timer will no longer be at $T_0$ thus the input to gate 1205 will be false, and also preventing any further advance pulses during the calling party time slot, that is, during the $A_1$ and $A_2$ pulses during DP1.

The following transmission cycle, TC8, the *h* core is readout during $A_1$ and flip-flop FF–H is set 1. If E is still true during $A_2$ the *k* core is written into since now H is true and the input to gates 915, 919, 921 and 923 are true. The *h* core is not written into again, however, since H′ is false at the input to gate 903. During this same transmission cycle, the *b* core is readout during $A_1$ and the flip-flop FF–B is set true, and the input to gates 237*a* and 236*a* will be true setting the output of the pulse stretching device 234*a* true.

The timer continues to advance during each transmission cycle in which E appears true and if E appears for seven consecutive transmission cycles the timer will have reached state F. This may be vertified by reference to the equations and to the graph shown in FIGS. 10 and 11. Also, the gate 237*a* in the line circuit LC11 is pulsed once per transmission cycle, causing the output of the pulse stretching device 234*a* to remain true.

When the timer reaches F, the core *y* associated with the flip-flop FF–Y of the line number advance circuit 1200 is written into during $A_2$ when the input to gates 1243 and 1245 are both true. Also, during $A_4$ the core *m* associated with the sequence flip-flop FF–M is written into.

The next transmission cycle (TC14) the timer will have advanced to Ω and both flip-flop FF–M and FF–Y will be set 1 when the associated cores are readout during $A_1$. When M becomes true the sequence state advances to $H_1$ since MN′P′ is now true. Core *y* is written into again during $A_2$, and will continue to be written into each transmission cycle thereafter until $ET_0$ becomes true to set Y false, which will be after dialing of the first digit.

The line circuit continues to be pulsed during each transmission cycle, and is ready for dialing.

In the first transmission cycle after the advance of the sesuence circuit, $H_1$ in coincidence with $A_2$ sets the flip-flop FF–DT in the signal state register. This condition is circulated with the cores of the high-speed memory 150 threaded by the conductor pair BT, so that pulses are supplied to the signaling circuits 170 so that dial tone is supplied in the time position DP1 over the multiplex transmission highway TL to the line circuit LC11. The line circuit continues to be pulsed during DP1 once per transmission cycle, with dial tone supplied to the calling subscriber station, and a link is ready in the register control circuits 400 to receive dial pulses.

*Connector Action*

The connector action is illustrated graphically in FIGS. 10 and 11 during the transmission cycle 16–40.

*Tens Digit Dialed*

At gate 1237 in the line number advance circuit, in each transmission cycle in which $\Omega YH_1$ is true during $A_4$ the rewrite signal $T_b'$ is inhibited and the five cores for the tens digit which link called line row DP2 of the high-speed memory 150 are cleared in preparation for dialing. A number of frames later dialing of the tens digit commences. When the subscriber at the station S11 presses one of the ten pushbuttons a capacitor associated with that pushbutton is included in the multivibrator circuit, simultaneously the contact 270 of the switch 269 is opened, transistor 261 is rendered conductive and the line loop is opened and closed as previously described. During TC16, when the line loop is open no pulse will appear on E during $A_2$ and E′ will be true. In the sequence circuit 1000 the input to the gates 907, 921 and 939 will be false since E is now false and the *h*, *k*, and *l* cores will not be written into. The line circuit will be continued to be marked busy since the output of the pulse stretch is true, and is continued to be held true since B is true.

In the line number advance circuit 1200, since the sequence is now in state $H_1$ the input to gate 1203 will be true. Since the line loop is open E′ will be true as well as $X'YA_2$ at the input to gate 1207 and the core *x* is written into.

During TC17, E′ will still be true since the called party's number is 22 and the width of the signal representative of the number 2 is greater than 3TC but less than 4TC. The timer circuit will advance to $T_0$ since during TC16 the *h*, *k*, and *l* cores were not written into and the flip-flops FF–H, FF–K and FF–L are set false during $A_1$. In the line number advance unit 1200 during $A_1$ the *x* core will be readout and the flip-flop FF–X will be set 1. With X now true and the sequence being in state $H_1$ during $A_4$ the inputs to gate 1223 will be true, thereby producing an advance signal on output $T_a'$ to advance the tens register 1300 and to also inhibit the rewrite signal $T_b'$ by inhibiting gate 1240. The tens register 1300 is advanced from cleared condition to the two-out-of-five code representing the digit 1.

During TC18, E′ will still be true and the input to gate 1203, 1207 and 1209 will all be true and the *x* core will again be written into. Some time during TC19 E will again become true since as stated the signal representing the digit 2 must be less than 4TC. As shown on the graph in FIGS. 10 and 11 it is shown that E becomes true during $A_2$. Since H′ is true when E becomes true during $A_2$ the *h* core is again written into since the input to gates 903, 907 and 909 will now all be true. The line number advance unit 1200 provides another advance signal to the tens register 1300 and the rewrite signal is inhibited since during $A_1$ the *x* core is readout of and the flip-flop FF–X is set 1, and during $A_4$ of TC19 the input to gates 1223 and 1221 are again true. Also, during $A_1$ flip-flop FF–Y is set Y′ when E becomes true since the input to gate 1249 and 1251 will now be true.

During TC20, the *h* core will be readout of during $A_1$ and the flip-flop FF–H will be set 1, the timer advancing from $T_0$ to $T_1$. Advance signals will no longer be supplied to the tens register 1300 since Y is now false and the core *x* can not be written into during $H_1$, and X must be true before an advance pulse can be provided.

Since E may become true one or more times during a single digit, some provision must be made for determining a digit dialed. Thus, the line number register 130 is advanced to register the digit dialed only during the first time that E is false and the first time that E reappears while $T_0$ is true the flip-flop FF–Y is set false to prevent any further advance of the line number register 130.

If E is true during eight consecutive transmission cycles the timer will have advanced, as previously described, to state Ω. This represents the interdigital pause. On the graph shown in FIGS. 10 and 11, this is represented during the transmission cycles TC19 through TC26.

During TC25, when H′KL is true the timer will have advanced to state F. During $A_4$ since M is true and F is true the input to gates 1013, 1015 and 1017 will all be true and the core *n* will be written into. Also, when the timer reaches state F core Y will again be written into during $A_2$. During the next transmission cycle TC26 Ω becomes true and the core *n* is readout during $A_1$ and the flip-flop FF–N in the sequence circuit 1000 is set 1. When N becomes true the sequence state advances from $H_1$ to $H_2$. Also, in the line number advance 1200 flip-flop FF–Y is again set 1 when the *y* core is readout during $A_1$.

Once Ω has become true it will remain true as long as E reappears during each transmission cycle. In the line number advance unit 1200 the input to gate 1227 will be true and the rewrite signal $U_b'$ will be inhibited and the units register is cleared in preparation for the second digit.

*Units Digit Dialed*

When the subscriber at the station S11 presses the pushbutton to dial the second digit the line loop is again opened and closed, as previously described. When E' becomes true the *h*, *k* and *l* cores will not be written into and the *x* core associated with the flip-flop FF–X of the line number advance unit 1200 is again written into, all as previously described. During TC30, since the cores *h*, *k* and *l* were not written into during the previous transmission cycle, H'K'L' will be true and the timer will again advance to state $T_0$. Also, during $A_1$ of this transmission cycle core *x* will be readout during $A_1$ to set flip-flop FF–X true and during $A_4$ the input to gates 1215 and 1217 will be true and a units advance pulse $U_a'$ will be provided to advance the units register 1302 of the line number register 130.

During TC32 E again becomes true and the *h* core will again be written into. The second units advance pulse $U_a'$ will be provided during this transmission cycle since the core *x* was readout during $A_1$ to set flip-flop FF–X true. Also, when E became true during the time that the timer was in state $T_0$ the input to gates 1249 and 1251 will be true during $A_1$ and the flip-flop FF–Y will be set false and no further units advance pulses will be provided, as previously described.

Once E has again become true and remains true for eight consecutive transmission cycles the timer will have again advanced through Ω. Prior to reaching state Ω when the timer was in state F the *p* core of the sequence circuit is written into and when Ω becomes true flip-flop FF–P will be set true, and the sequence state will advance from $H_2$ to $H_3$ since MNP are all true.

*Called Line Busy*

The transmission cycles TC40 to TC42 shows the conditions if the called line is busy. During TC40 if the called party is busy E and C will both be true during $A_4$ and the input to gates 1009 and 1007 will be true thus setting flip-flop FF–M false, and the sequence state will advance to $H_4$. In the signal state register 1400, the signals Ω and $H_4$ in coincidence with $A_2$ will set the flip-flop FF–BT and, therefore, pulses BT–1 are supplied to the signaling circuit 170 during the calling line time slot, DP–1 (link 1) to supply busy tone over the multiplex highway to the calling line.

Upon hearing busy tone, the calling party will disconnect and E will no longer be true during $A_2$. In the sequence circuit the input to the gates 1011 and 1007 will be true to set flip-flop FF–M false, the input to the gates 1025 and 1021 will be false to set flip-flop FF–N false and the input to the gates 1037 and 1035 will be false to set the flip-flop FF–P false, thus the sequence circuit will advance to $H_n$. The busy tone flip-flop FF–BT in the signal state register 1400 will also be reset, and the link is now idle.

*Called Line Idle—Ringing*

The transmission cycles TC43 to TC47 show the conditions if the called line is idle. If E is not true during $A_4$ of the called party time slot the sequence circuit will remain in $H_3$. The signal $H_3$ appearing in the signal state register 1400 sets the flip-flop FF–RT during $A_2$, and in $A_4$ the flip-flop FF–RG is set true. The signal state register 1400 now supplies the pulses during each transmission cycle with RT–1 in the calling line time slot causing ringing tone to be supplied from the signaling circuit 170 over the multiplex highway to the calling line, and the ringing signal RG–1 to be supplied directly to the line circuit. In addition, when $H_3$ and C' are true during $A_4$ the *b* core of the called party's row is written into since the input to gates 1101, 1103, and 1105 will all be true. The following cycle the core will be readout during $A_3$ and the flip-flop FF–B will be set true and the called line will be marked busy.

*Answer and Conversation*

When the called party answers (TC45), E will be true during $A_4$ of the called party time slot and the input to gates 1009, 1007, 1023, and 1021 will all be true and the flip-flops FF–M and FF–N will both be set false, advancing the sequence state to $H_5$. During TC46 the RT and RG registers in the signal state register are reset and the flip-flop FF–ST is set during both $A_2$ and $A_4$ so that both the calling and called lines are switched through. The output signal ST–1 from the signal state register is supplied to the transmission gates of the calling and called line in link 1 in the time slot DP1 and DP2, respectively. During conversation, $H_5$ and $A_4$ will remain true at the input to the gates 901, 909, 923 and 939 and the cores *h*, *k*, and *l* will be written into during each transmission cycle thus the timer is held at Ω as long as the sequence switch remains at $H_5$. This will prevent releasing the circuit through false operation.

*Disconnect*

As soon as the calling party hangs-up and C' becomes true, flip-flop FF–P will be set false during $A_2$ since the inputs to gates 1037 and 1035 will now be true. As soon as P' becomes true the sequence state advances to $H_n$. In the signal state register the E' in coincidence with $A_2$ resets the ST register for the calling line, and E' in coincidence with $A_4$ resets this register for the called line. The link is now idle.

If the calling party hangs-up at any time during a sequence, the sequence switch will be reset to $H_n$ since all of the sequence flip-flops FF–M, FF–N, and FF–P are set 0 by $C'A_2$. Thus, if the calling party disconnects during ringing or during dialing, the sequence circuit will advance to $H_n$ and the link will be idle.

*Circuit Details*

Reference is made to the Faulkner et al. Patent 3,015,699 for the detailed circuitry used in the present application. The flip-flops, constant current generators, amplifiers, logic gates, and etc. are primarily of the same type and description as those disclosed in the above-mentioned patent to Faulkner, and wherever changes are necessary or desirable it will be obvious to those skilled in the art.

While we have described above the principles of our invention in connection with specific apparatus, it is to be clearly understood that this description is made only by way of example and not as a limitation to the scope of our invention as defined in the appended claims.

What is claimed is:

1. A communication system comprising:
   - a plurality of substations;
   - a plurality of line circuits each including a source of direct current;
   - a plurality of subscriber lines, each connecting individual ones of said substations and said line circuits, and terminated in said line circuts by the corresponding source of direct current;
   - a calling device at each of said substations operated to repetitively interrupt the flow of direct current over the associated subscriber line and place the subscriber line in off-hook and on-hook conditions as a train of pulses for each operation thereof, the width of the pulses of each said train being unique to a digit value;
   - a source of cyclically recurring pulses;
   - time division means operated by said cyclically recurring pulses to scan said line circuits and sample the condition of said lines;
   - counting means for determining the value of a digit; and
   - means for advancing said counting means once for every predetermined number of samplings of a calling line for which said line is successively detected in an on-hook condition, said advancing operation being terminated when the first-sampled off-hook condition is detected.

2. In a time division multiplex communication system, the combination as claimed in claim 1, wherein said calling device at each of said substations includes:

a normally conductive switching transistor connected in series with said pair of line conductors;

a multivibrator normally in a first state of operation, activating means operated to cause said multivibrator to shift to a second state of operation to render said switching transistor nonconductive to interrupt the normal flow of direct-current from said source over said pair of line conductors, and means operated in response to the operation of said actuating means for controlling the time interval said multivibrator remains in said second state of operation.

3. In a time division multiplex communication system, the combination as claimed in claim 2, wherein said means for varying the time interval of said multivibrator remains in said second state comprises a plurality of capacitors, each of which may be individually connected in said multivibrator circuit and each of which establishes said second state time interval at a time representative of a predetermined digit; and wherein said actuating means comprises a plurality of pushbuttons and a switch, each of said pushbuttons being operative to connect one of said plurality of capacitors in said multivibrator circuit and to operate said switch.

4. The communication system according to claim 1, and further comprising:

timing means operated in response to sampled off-hook conditions; and means to register the sequence state of a call operated in response to the condition of said timing means and in response to said sampled off-hook conditions.

5. In a time division multiplex communication system:

a plurality of line circuits, each including a source of direct-current and each including multiplex gating means;

a plurality of subscriber substations;

a pair of line conductors connecting individual ones of said substations and said line circuits, said line conductors terminated in its associated line circuit by said source of direct-current;

a calling device at each of said substations operated to interrupt the normal flow of direct-current from said source over said pair of line conductors for predetermined intervals of time for providing variable-width direct-current supervisory signals;

a source of cyclically recurring pulses;

time division multiplex transmission means for selectively establishing effective connections between said line circuits; and common control equipment shared on a time division multiplex basis, said common control equipment including means for scanning said line circuits for said variable-width direct-current supervisory signals, means for associating a given time interval recurring each cycle of said source of cyclically recurring pulses with a given call, a single circulating memory means for selectively storing the identity of the individual line circuits to be effectively connected over said time division multiplex transmission means in a given call and for storing the sequence state of said call, and apparatus time shared by the individual calls during repetitive pulse cycles of, and controlled by, the circulating memory means for selectively supplying cyclically recurring enabling pulses to the respective multiplex gating means in said line circuits to establish said effective connection in accordance with said stored information, and for selectively altering said stored information in accordance with said received direct-current supervisory signals, all during said time interval associated with a given call.

6. In a time division multiplex communication system, the combination as claimed in claim 5, wherein said single circulating memory means includes:

a matrix of storage elements arranged in columns and rows, the identity of the individual line circuits to be effectively connected over said time division multiplex transmission means in a given call and the sequence state of said call being selectively stored in said storage elements in said rows; and a plurality of bistable devices individually associated with the columns of storage elements and time shared by the individual calls during repetitive pulse cycles of, and controlled by, said circulating memory for selectively supplying cyclically recurring enabling pulses to the respective multiplex gating means in said line circuits to establish said effective connections in accordance with said stored information, and for selectively altering said stored information in accordance with received supervisory signals.

7. In a time division multiplex communication system, the combination as claimed in claim 6, wherein each pair of adjacent rows in said circulating memory means comprises a time interval associated with a given call, and each one of said rows in a particular time interval comprises a time slot in the repetitive cycle of said source of pulses, one of said rows being associated with the calling and the called line circuits, respectively, in a given call.

8. In a time division multiplex communication system:

a first group of transmission paths, each having a terminating unit including a direct-current source individually connected thereto;

a second group of transmission paths, each having a connecting unit individually connected thereto;

a time division multiplex transmission medium between and common to said terminating units and each of said connecting units;

a transmission gate included in each of said terminating units and in each of said connecting units interposed between its transmission path and the common transmission medium;

a plurality of subscriber substations;

a pair of line conductors connecting individual ones of said substations and said terminating units, said line conductors being terminated by said direct-current source;

a calling device in each of said substations operated to interrupt the normal flow of direct-current from said source over said pair of line conductors for predetermined intervals of time for providing variable-width direct-current supervisory signals; and common control equipment shared on a time division multiplex basis by said connecting units, said common control equipment including circulating memory means for selectively storing the identity of the individual terminating unit to be effectively connected over said common transmission medium with an individual connecting unit in a given call and for storing the sequence state of said call, and including apparatus time shared by the individual calls during repetitive pulse cycles of, and controlled by, the circulating memory means for selectively supplying cyclically recurring enabling pulses to the respective transmission gates to establish said effective connection in accordance with said stored information, and for selectively altering said stored information in accordance with received supervisory signals.

9. In a time division multiplex communication system, the combination as claimed in claim 8, wherein said circulating memory means includes:

a matrix of storage elements arranged in columns and rows, the identity of the individual terminating unit to be effectively connected over said common transmission medium with an individual connecitng unit in a given call and the sequence state of said call being selectively stored in said storage elements in said rows.

10. In a time division multiplex communication system, the combination as claimed in claim 9, wherein:

a plurality of links are provided for completing communication connections between any two of said terminating units, each link comprising two of said connecting units, one being a line finder for establishing an originating connection to a calling one of said terminatig uits, and the other being a connector for establishing a terminating connection to a called one of said terminating units, the line finder and connector of each link being connected by one of said second transmission paths.

11. In a time division multiplex communication system, the combination as claimed in claim 10, wherein each pair of adjacent rows in said circulating memory means comprises a time interval associated with one of said links in a given call, and each one of said rows in a particular time interval comprises a time slot in the repetitive cycle of said source of pulses, one of said rows being associated with said line finder and the other of said rows being associated with said connector, in a given call.

12. In a time division multiplex communication system, the combination as claimed in claim 11, wherein said common control equipment further includes:

a plurality of bistable devices individually associated with the columns of storage elements and time shared by the individual calls during repetitive pulse cycles of, and controlled by, said circulating memory for selectively supplying cyclically recurring enabling pulses to the respective transmission gate in said terminating units and said connecting units in a given call to establish said effective connections in accordance with said stored information, and for selectively altering said stored information in accordance with received direct-current supervisory signals.

13. In a time division multiplex communication system of the type wherein each of the subscriber substations are individually connected by a pair of line conductors to a source of direct-current in an associated line circuit and wherein common control equipment shared on a time division multiplex basis is controlled by supervisory signals extended from said subscriber substations for effectively establishing connections between individual ones of said subscriber substations in accordance with said supervisory signals, the combination therewith including a calling device at each of said subscriber substations for providing variable-width direct-current supervisory signals including a normally conductive switching transistor connected in series with said pair of line conductors, a multivibrator normally in a first state of operation, activating means operated to cause said multivibrator to shift to a second state of operation to render said switching transistor nonconductive to interrupt the normal flow of direct-current from said source over said pair of line conductors, and means operated in response to the operation of said activating means for controlling the time interval said multivibrator remains in said second state of operation.

14. A calling device such as claimed in claim 13, wherein said means for varying the time interval said multivibrator remains in said second state comprises a plurality of capacitors, each of which may be individually connected in said multivibrator circuit and each of which establishes said second state time interval at a time representative of a predetermined digit, and wherein said activating means comprises a plurality of pushbuttons and a switch, each of said pushbuttons being operative to connect one of said plurality of capacitors in said multivibrator and to operate said switch.

15. In a telephone system, a plurality of subscriber lines, substations connected to said lines, switching means of the time division multiplex type for selectively interconnecting said lines in accordance with directory number signals received from said substations, each of said substations including selectively operable directory number calling means, a pulse generator for transmitting a train of repetitive pulses over the corresponding line for each digit of a called directory number, and means governed by said calling means for controlling the pulse width of said repetitively transmitted pulses of each said train in accordance with the selected digit, said time division multiplex switching means including detector apparatus for determining said digit from the width of the received repetitive pulses.

References Cited in the file of this patent

UNITED STATES PATENTS

| | | |
|---|---|---|
| 2,320,401 | Beizer et al. | June 1, 1943 |
| 2,329,022 | Willis | Sept. 7, 1943 |
| 2,345,987 | Neiswinter | Apr. 4, 1944 |
| 2,892,035 | Trousdale | June 23, 1959 |
| 2,917,583 | Burton et al. | Dec. 15, 1959 |
| 2,955,165 | Budlong et al. | Oct. 4, 1960 |
| 3,015,699 | Faulkner et al. | Jan. 2, 1962 |
| 3,033,935 | Melvin | May 8, 1962 |